United States Patent
Chawla et al.

(10) Patent No.: US 11,630,707 B2
(45) Date of Patent: Apr. 18, 2023

(54) COMPOSABLE INFORMATION HANDLING SYSTEMS IN AN OPEN NETWORK USING ACCESS CONTROL MANAGERS

(71) Applicant: Dell Products L.P., Hopkinton, MA (US)

(72) Inventors: Gaurav Chawla, Austin, TX (US); Mark Steven Sanders, Roanoke, VA (US); William Price Dawkins, Lakeway, TX (US); Jimmy Doyle Pike, Georgetown, TX (US); Elie Antoun Jreij, Pflugerville, TX (US); Robert Wayne Hormuth, Cedar Park, TX (US); Walter A. O'Brien, III, Westborough, MA (US); Mukund P. Khatri, Austin, TX (US); Yossef Saad, Ganei Tikva (IL)

(73) Assignee: Dell Products L.P., Round Rock, TX (US)

( * ) Notice: Subject to any disclaimer, the term of this patent is extended or adjusted under 35 U.S.C. 154(b) by 164 days.

(21) Appl. No.: 17/117,067

(22) Filed: Dec. 9, 2020

(65) Prior Publication Data
US 2022/0179718 A1  Jun. 9, 2022

(51) Int. Cl.
*G06F 9/455* (2018.01)
*G06F 9/50* (2006.01)

(52) U.S. Cl.
CPC ........ *G06F 9/5083* (2013.01); *G06F 9/45541* (2013.01); *G06F 9/5077* (2013.01)

(58) Field of Classification Search
CPC ............................ G06F 9/45541; G06F 9/5077
See application file for complete search history.

(56) References Cited

U.S. PATENT DOCUMENTS 7,478,117 B1   1/2009 Lamb et al.
7,606,892 B2  10/2009 Piet et al.
(Continued)

OTHER PUBLICATIONS

Alachiotis, Nikolaos, et al. "dReDBox: A disaggregated architectural perspective for data centers." Hardware Accelerators in Data Centers. Springer, Cham, 2019. pages 35-56. (Year: 2019) (22 pages).

(Continued)

*Primary Examiner* — Dong U Kim
(74) *Attorney, Agent, or Firm* — Chamberlain, Hrdlicka, White, Williams & Aughtry

(57) ABSTRACT

A method for managing composed information handling systems includes obtaining a composition request for a composed information handling system, making a first determination that a first information handling system is not capable of servicing the composition request local, and based on the first determination: allocating, an available resource on the first information handling system to the composed information handling system, sending a resource allocation request to a system control processor manager for access to an additional resource, obtain, in response to the allocation request, a notification for access to a second information handling system of the information handling systems that provides the available resource, setting up management services for available resource and the additional resource to obtain logical hardware resources, and presenting the logical hardware resources to at least one compute resource set as bare metal resources.

15 Claims, 13 Drawing Sheets

(56) References Cited

U.S. PATENT DOCUMENTS

| | | | |
|---|---|---|---|
| 7,620,984 | B2 | 11/2009 | Kallahalla |
| 8,276,140 | B1 | 9/2012 | Beda, III et al. |
| 8,285,747 | B1 | 10/2012 | English |
| 8,306,948 | B2 | 11/2012 | Chou |
| 8,499,066 | B1 | 7/2013 | Zhang et al. |
| 8,589,659 | B1 | 11/2013 | Shapiro |
| 8,606,920 | B1 | 12/2013 | Gupta et al. |
| 8,997,242 | B2 | 3/2015 | Chen |
| 9,104,844 | B2 | 8/2015 | Fang |
| 9,105,178 | B2 | 8/2015 | Carlson |
| 9,245,096 | B2 | 1/2016 | Abuelsaad |
| 9,569,598 | B2 | 2/2017 | Abuelsaad |
| 9,613,147 | B2 | 4/2017 | Carlson |
| 9,678,977 | B1 | 6/2017 | Aronovich |
| 9,959,140 | B2 | 5/2018 | Jackson |
| 10,348,574 | B2 | 7/2019 | Kulkarni |
| 10,382,279 | B2 | 8/2019 | Roese |
| 10,601,903 | B2 | 3/2020 | Bivens |
| 10,628,225 | B2 | 4/2020 | Yamato |
| 10,756,990 | B1 | 8/2020 | Chakkassery Vidyadharan et al. |
| 10,782,882 | B1 | 9/2020 | Wu |
| 10,795,856 | B1 | 10/2020 | Smith et al. |
| 10,909,283 | B1 | 2/2021 | Wang et al. |
| 10,994,198 | B1 | 5/2021 | Byskal et al. |
| 11,119,739 | B1* | 9/2021 | Allen ................. H04L 63/0263 |
| 11,134,013 | B1 | 9/2021 | Allen et al. |
| 11,221,886 | B2 | 1/2022 | Bivens et al. |
| 2003/0028642 | A1 | 2/2003 | Agarwal et al. |
| 2003/0233427 | A1 | 12/2003 | Taguchi |
| 2004/0257998 | A1 | 12/2004 | Chu et al. |
| 2006/0082222 | A1 | 4/2006 | Pincu et al. |
| 2006/0236100 | A1 | 10/2006 | Baskaran et al. |
| 2008/0052480 | A1 | 2/2008 | Satoyama et al. |
| 2008/0313476 | A1 | 12/2008 | Hansen |
| 2009/0199193 | A1 | 8/2009 | Jackson |
| 2011/0099147 | A1 | 4/2011 | Mcalister et al. |
| 2011/0154500 | A1 | 6/2011 | Sahita et al. |
| 2011/0307570 | A1 | 12/2011 | Speks |
| 2012/0047328 | A1 | 2/2012 | Williams et al. |
| 2013/0007710 | A1 | 1/2013 | Vedula et al. |
| 2013/0332901 | A1* | 12/2013 | Berg ......................... G06F 8/71 717/121 |
| 2013/0346718 | A1 | 12/2013 | Meshchaninov et al. |
| 2014/0007097 | A1 | 1/2014 | Chin et al. |
| 2014/0165063 | A1 | 6/2014 | Shiva et al. |
| 2014/0223233 | A1 | 8/2014 | Heyrman et al. |
| 2014/0282820 | A1 | 9/2014 | Walton et al. |
| 2014/0359356 | A1 | 12/2014 | Aoki |
| 2015/0106165 | A1 | 4/2015 | Rai et al. |
| 2015/0220455 | A1 | 8/2015 | Chen et al. |
| 2015/0317173 | A1 | 11/2015 | Anglin |
| 2016/0062441 | A1 | 3/2016 | Chou et al. |
| 2016/0180087 | A1 | 6/2016 | Edwards et al. |
| 2016/0224903 | A1 | 8/2016 | Talathi et al. |
| 2016/0259665 | A1* | 9/2016 | Gaurav ............... G06F 9/45558 |
| 2017/0041184 | A1 | 2/2017 | Broz et al. |
| 2017/0048200 | A1* | 2/2017 | Chastain ............. H04W 12/088 |
| 2017/0097851 | A1 | 4/2017 | Chen |
| 2017/0118247 | A1 | 4/2017 | Hussain |
| 2017/0195201 | A1 | 7/2017 | Mueller et al. |
| 2018/0024964 | A1 | 1/2018 | Mao |
| 2018/0063145 | A1 | 3/2018 | Cayton et al. |
| 2019/0065061 | A1 | 2/2019 | Kim et al. |
| 2019/0065256 | A1 | 2/2019 | Hamilton et al. |
| 2019/0164087 | A1 | 5/2019 | Ghibril et al. |
| 2019/0188014 | A1* | 6/2019 | Easterling ........... G06F 9/45533 |
| 2019/0190778 | A1* | 6/2019 | Easterling ........... G06F 9/45558 |
| 2019/0205180 | A1 | 7/2019 | Macha et al. |
| 2019/0227616 | A1 | 7/2019 | Jenne et al. |
| 2019/0334774 | A1 | 10/2019 | Bennett et al. |
| 2019/0356729 | A1 | 11/2019 | Bivens et al. |
| 2019/0356731 | A1 | 11/2019 | Bivens et al. |
| 2019/0384516 | A1 | 12/2019 | Bernat |
| 2020/0026564 | A1 | 1/2020 | Bahramshahry et al. |
| 2020/0028854 | A1 | 1/2020 | Fabrizi et al. |
| 2020/0044966 | A1* | 2/2020 | Krishnan ............ H04L 61/5007 |
| 2020/0065254 | A1 | 2/2020 | Cao et al. |
| 2020/0174949 | A1 | 6/2020 | Ramasamy et al. |
| 2020/0218561 | A1* | 7/2020 | Lal ...................... H04L 67/1008 |
| 2020/0233582 | A1 | 7/2020 | Chen et al. |
| 2020/0293375 | A1 | 9/2020 | Klein |
| 2020/0341786 | A1* | 10/2020 | Soryal ................. G06F 9/45558 |
| 2020/0341798 | A1 | 10/2020 | Duleba |
| 2020/0356200 | A1 | 11/2020 | Blanco et al. |
| 2020/0358714 | A1* | 11/2020 | Singleton, IV ....... H04L 67/141 |
| 2021/0019062 | A1 | 1/2021 | Fessel |
| 2021/0037466 | A1 | 2/2021 | Silva et al. |
| 2021/0111942 | A1 | 4/2021 | Tahhan et al. |
| 2021/0117441 | A1 | 4/2021 | Patel et al. |
| 2021/0152659 | A1 | 5/2021 | Cai et al. |
| 2021/0224093 | A1 | 7/2021 | Fu et al. |
| 2021/0367901 | A1 | 11/2021 | Singh et al. |
| 2021/0397494 | A1 | 12/2021 | Graham |
| 2022/0179701 | A1 | 6/2022 | Saad et al. |
| 2022/0197773 | A1 | 6/2022 | Butler et al. |

OTHER PUBLICATIONS

Anonymous: "Dell Chassis Management Controller Version 6.20 for PowerEdge M1000e" Dec. 3, 2018 (Dec. 3, 2018) 274 pages, Retrieved from the Internet: URL:https://dl/del/com/topicspdf/dell-chassis-management-controller-v620-poweredge-m1000e_users-guide_en-us.pdf.

International Search Report dated Aug. 9, 2021, issued in corresponding PCT Application No. PCT/US2021/029698 (5 pages).

Written Opinion of the International Searching Authority dated Aug. 9, 2021, issued in corresponding PCT Application No. PCT/US2021/029698 (10 pages).

International Search Report dated Jul. 19, 2021, issued in corresponding PCT Application No. PCT/US2021/029687 (2 pages).

Written Opinion of the International Searching Authority dated Jul. 19, 2021, issued in corresponding PCT Application No. PCT/US2021/029687 (9 pages).

International Search Report dated Oct. 21, 2021, issued in corresponding PCT Application No. PCT/US2021/029708 (5 pages).

Written Opinion of the International Searching Authority dated Oct. 21, 2021, issued in corresponding PCT Application No. PCT/US2021/029708 (7 pages).

International Search Report dated Aug. 19, 2021, issued in corresponding PCT Application No. PCT/US2021/029702 (5 pages).

Written Opinion of the International Searching Authority dated Aug. 19, 2021, issued in corresponding PCT Application No. PCT/US2021/029702 (8 pages).

Mohammadi et al., Towards an end-to-end architecture, 2018, pp. 514-518, 44th Euromicro Conference (5 pages).

\* cited by examiner

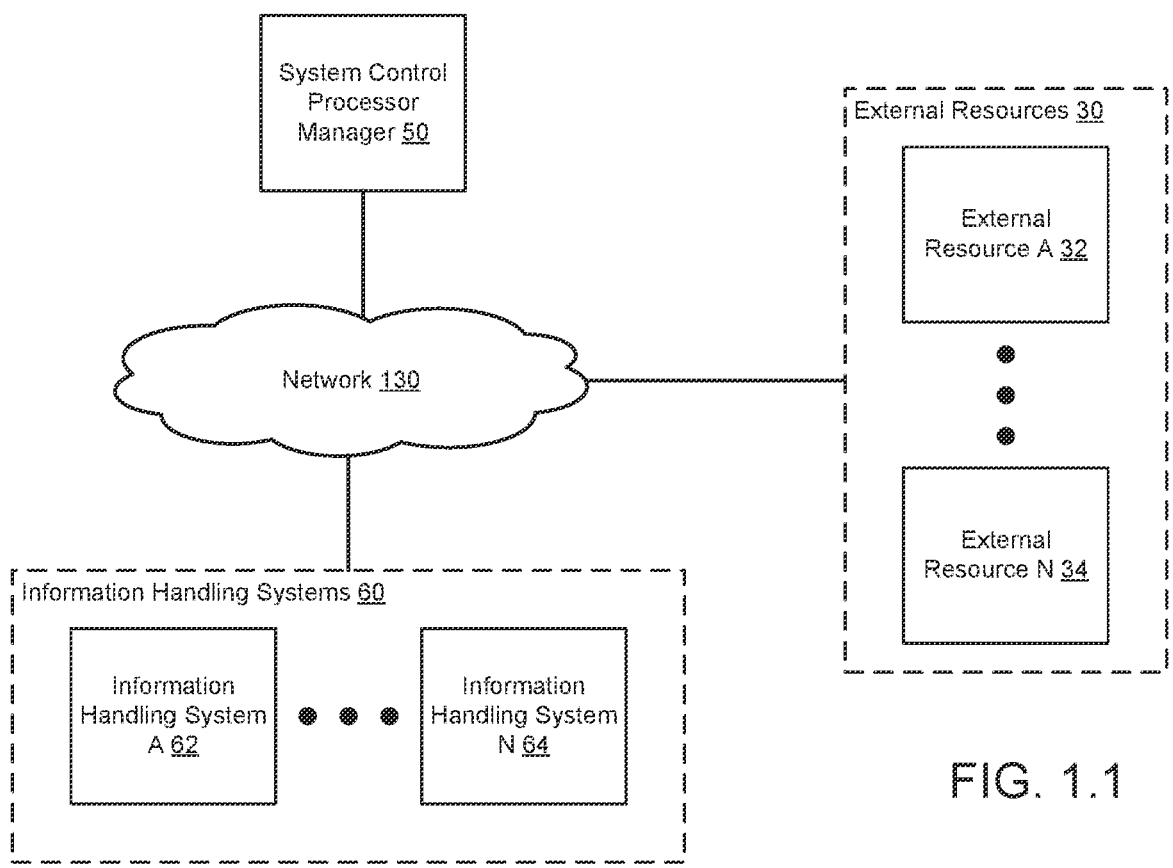
FIG. 1.1

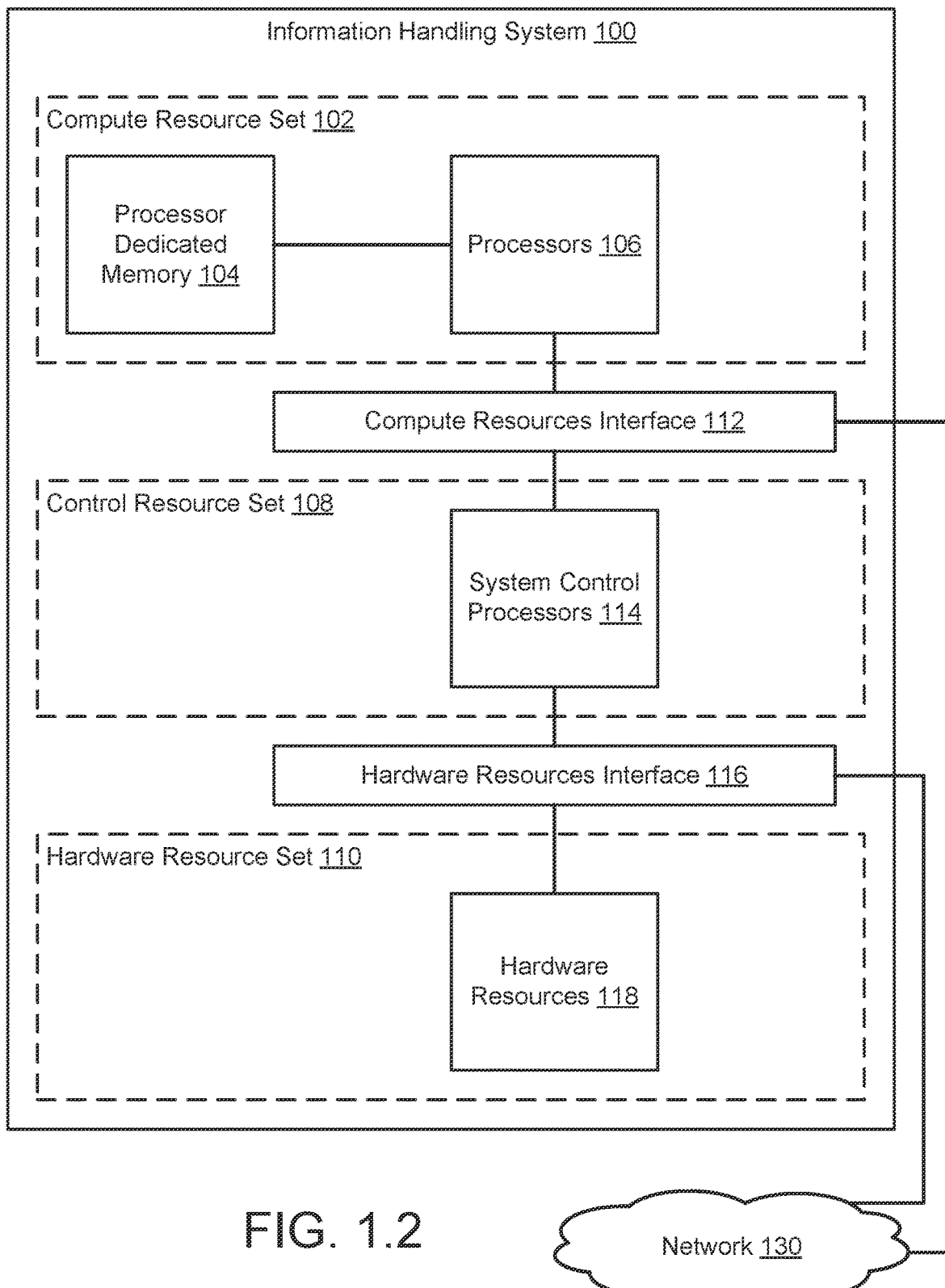
FIG. 1.2

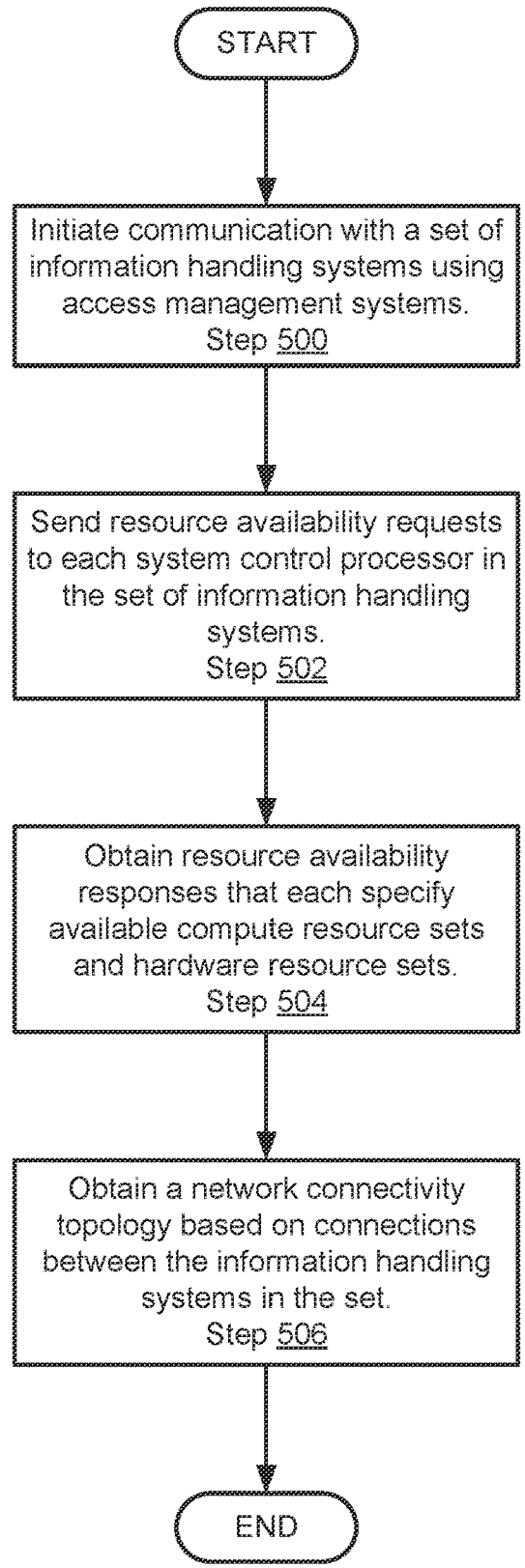
FIG. 5.1

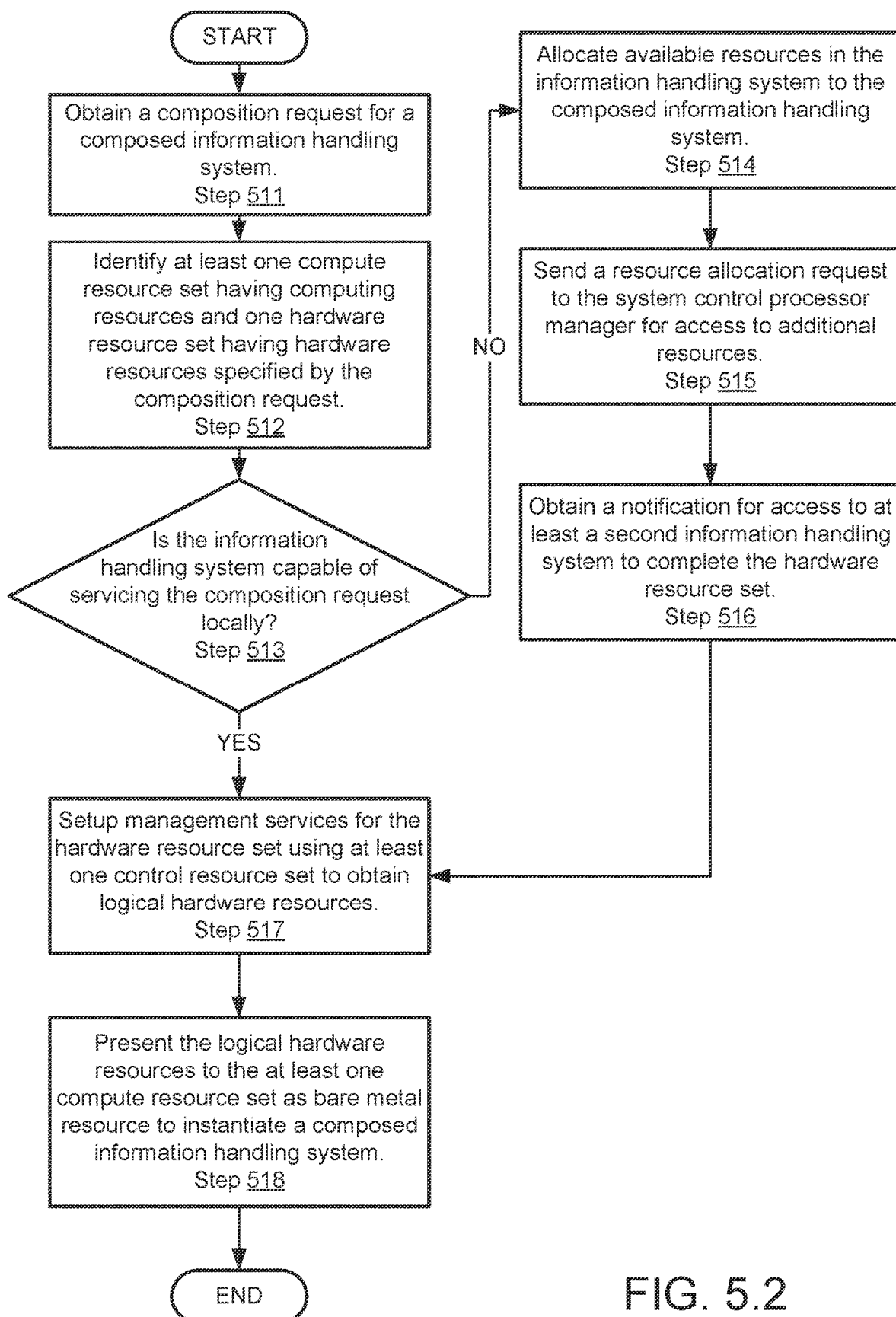
FIG. 5.2

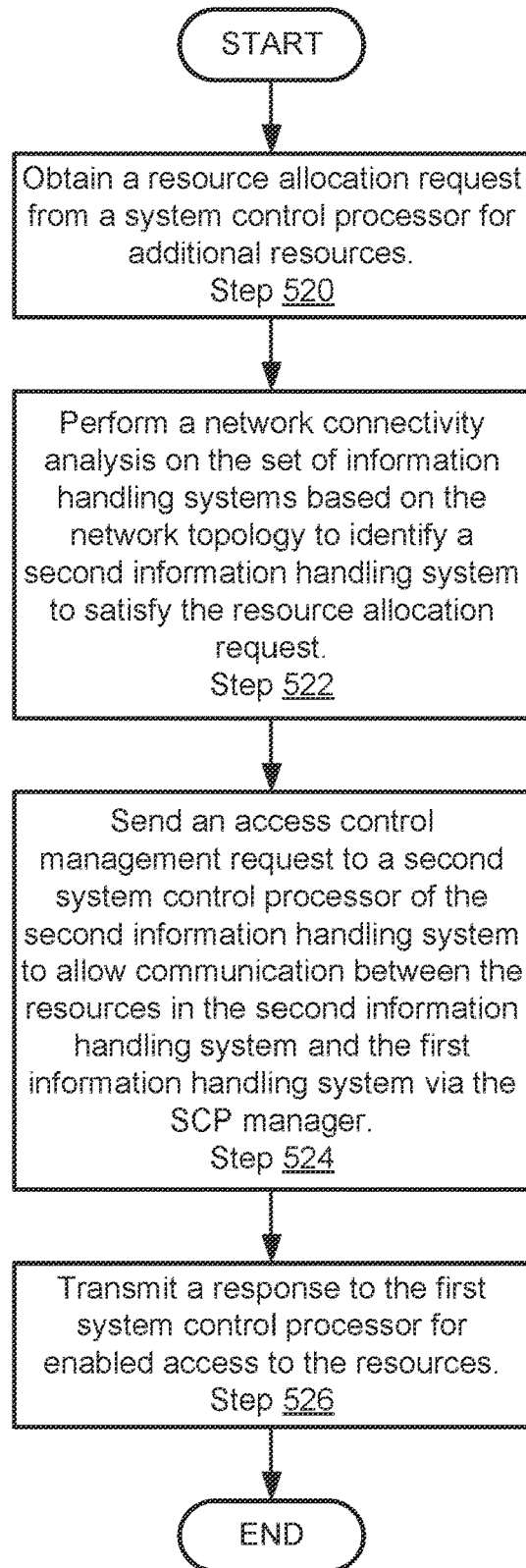
FIG. 5.3

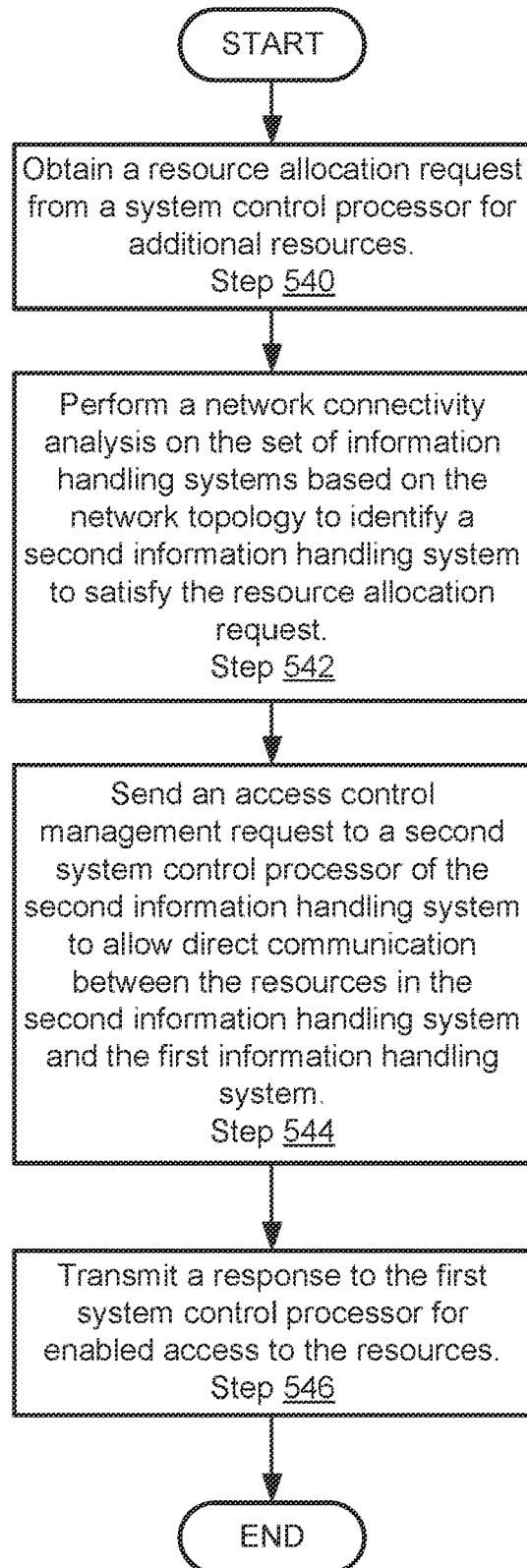
FIG. 5.4

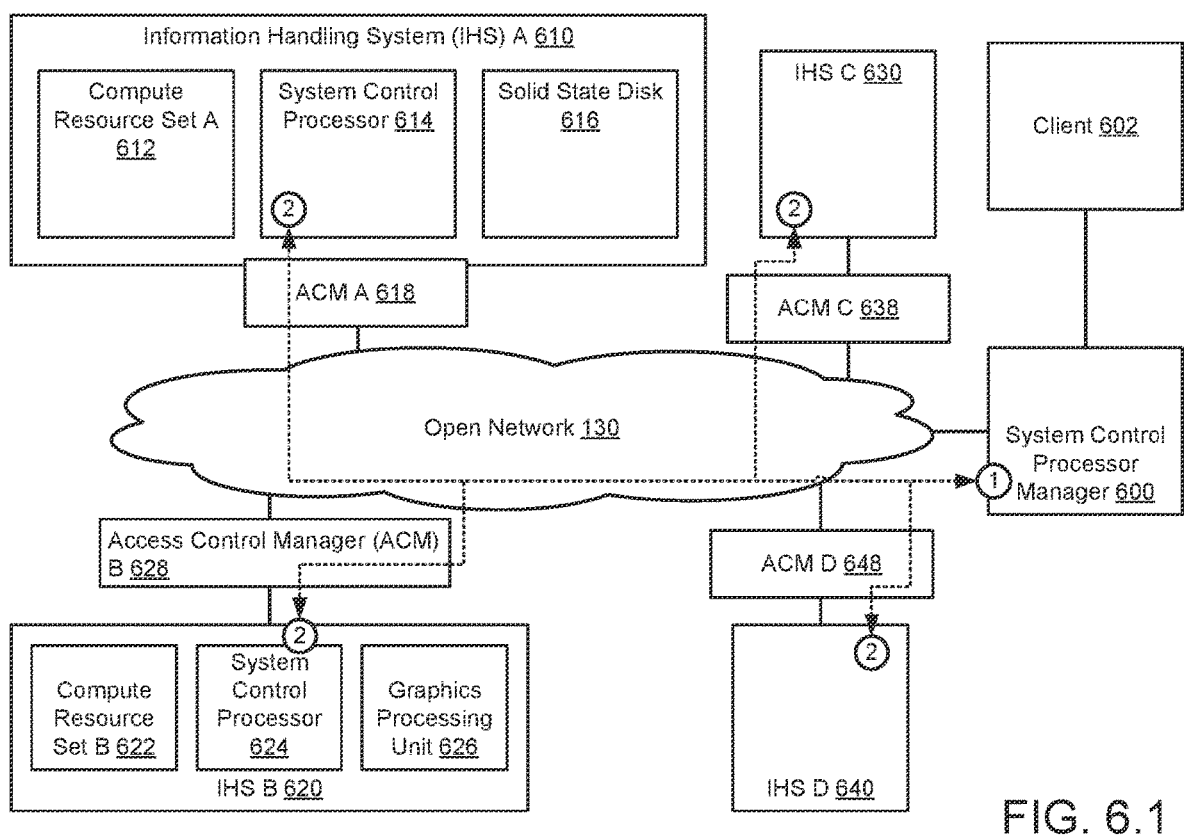
FIG. 6.1

Telemetry Data Map 650

Information Handling System (IHS) A Entry 652
- Hardware Resource Set: 4 Terabyte Solid State Disk 652A
- Network Port A Bandwidth: 60Mbps 652B
- Network Port B Bandwidth: 50Mbps 652C

IHS B Entry 654
- Hardware Resource Set: Graphics Processing Unit 654A
- Network Port C Bandwidth: 40Mbps 654B
- Network Port D Bandwidth: 60Mbps 654C

IHS C Entry 656
- Hardware Resource Set: 8 Terabyte Solid State Disk 656A
- Network Port E Bandwidth: 40Mbps 656B
- Network Port F Bandwidth: 0Mbps 656C

IHS D Entry 658
- Hardware Resource Set: Graphics Processing Unit 658A
- Network Port G Bandwidth: 0Mbps 658B
- Network Port H Bandwidth: 5Mbps 658C

FIG. 6.2

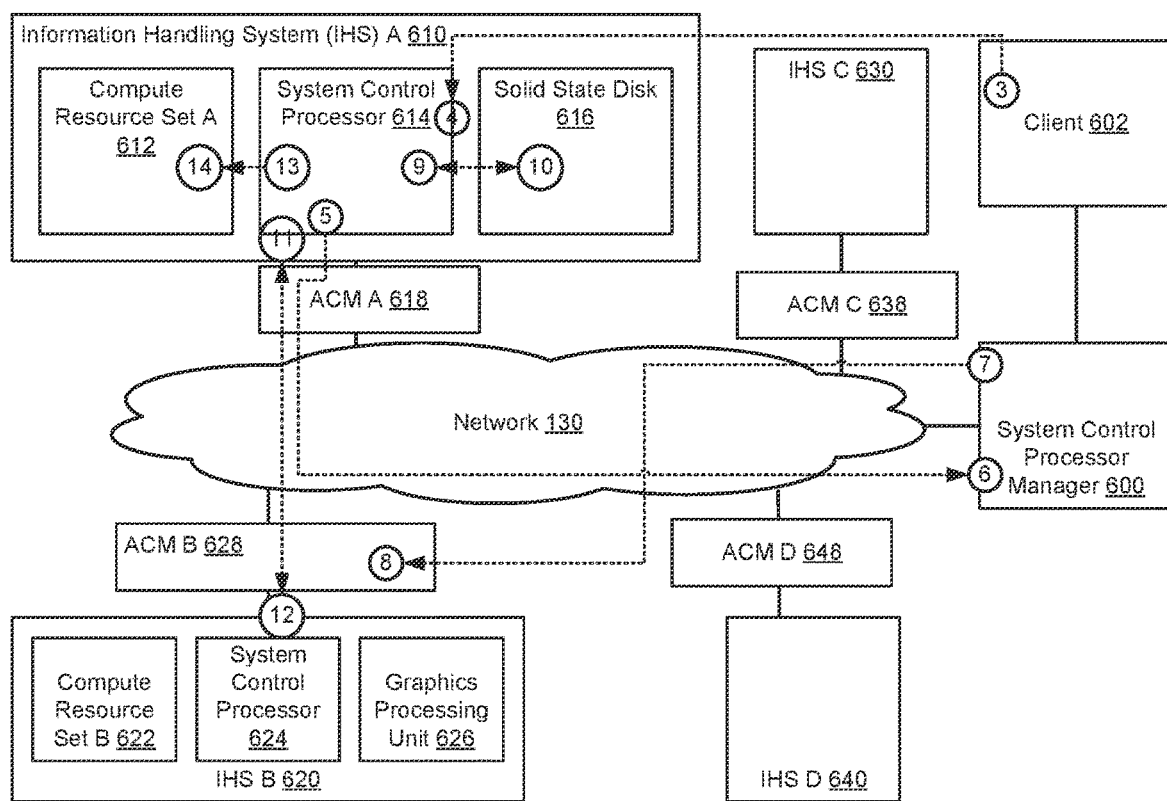
FIG. 6.3

COMPOSABLE INFORMATION HANDLING SYSTEMS IN AN OPEN NETWORK USING ACCESS CONTROL MANAGERS

BACKGROUND

Computing devices may provide services. To provide the services, the computing devices may include hardware components and software components. The services provided by the computing devices may be limited by these components.

SUMMARY

In general, in one aspect, the invention relates to a system that includes a first information handling system of the information handling systems that includes a system control processor and at least one computing resource set, wherein the system control processor is programmed to: obtain a composition request for a composed information handling system, make a first determination that the first information handling system is not capable of servicing the composition request locally, and based on the first determination: allocate, an available resource on the first information handling system to the composed information handling system, sending a resource allocation request to a system control processor manager for access to an additional resource, obtain, in response to the allocation request, a notification for access to a second information handling system of the information handling systems that provides the available resource, setup management services for available resource and the additional resource to obtain logical hardware resources, and present the logical hardware resources to the at least one compute resource set as bare metal resources.

In general, in one aspect, the invention relates to a method for providing computer implemented services using information handling systems. The method includes obtaining, by a system control processor, a composition request for a composed information handling system, making a first determination that a first information handling system is not capable of servicing the composition request local, and based on the first determination: allocating, an available resource on the first information handling system to the composed information handling system, sending a resource allocation request to a system control processor manager for access to an additional resource, obtain, in response to the allocation request, a notification for access to a second information handling system of the information handling systems that provides the available resource, setting up management services for available resource and the additional resource to obtain logical hardware resources, and presenting the logical hardware resources to at least one compute resource set as bare metal resources, wherein the first information handling system comprises the system control processor and the at least one compute resource set.

In general, in one aspect, the invention relates to a non-transitory computer readable medium that includes computer readable program code, which when executed by a computer processor enables the computer processor to perform a method for providing computer implemented services using information handling systems. The method includes obtaining, by a system control processor, a composition request for a composed information handling system, making a first determination that a first information handling system is not capable of servicing the composition request local, and based on the first determination: allocating, an available resource on the first information handling system to the composed information handling system, sending a resource allocation request to a system control processor manager for access to an additional resource, obtain, in response to the allocation request, a notification for access to a second information handling system of the information handling systems that provides the available resource, setting up management services for available resource and the additional resource to obtain logical hardware resources, and presenting the logical hardware resources to at least one compute resource set as bare metal resources, wherein the first information handling system comprises the system control processor and the at least one compute resource set.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 5.1 shows a flowchart of a method of obtaining resource availability and a network connectivity topology in accordance with one or more embodiments of the invention.

FIG. 5.2 shows a flowchart of a method of generating a composed information handling system based on a composition request in accordance with one or more embodiments of the invention.

FIG. 5.3 shows a flowchart of a method of initiating access between SCPs via the SCP manager in accordance with one or more embodiments of the invention.

FIG. 5.4 shows a flowchart of a method of initiating direct access between SCPs in accordance with one or more embodiments of the invention.

FIGS. 6.1-6.3 show diagrams of the operation of an example system over time in accordance with one or more embodiments of the invention.

DETAILED DESCRIPTION

Figure 2:
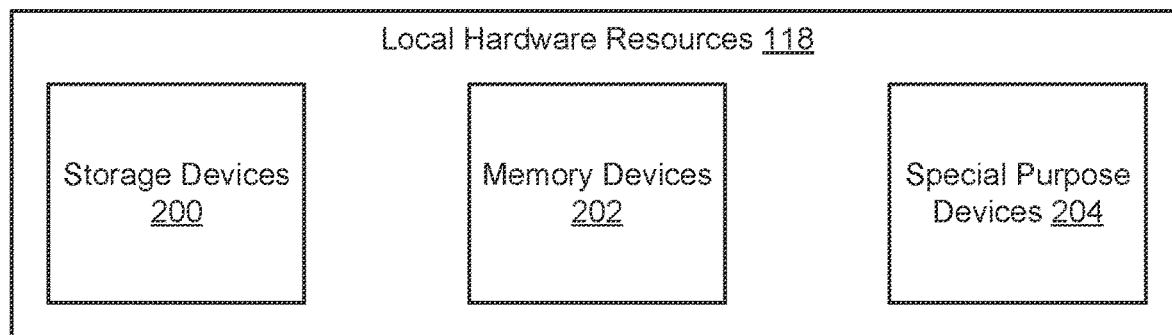
FIG. 2 shows a diagram of hardware resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing computer implemented services. To provide computer implemented services, computing resources may need to be allocated for the performance of the services. The services may include, for example, processing resources, memory resources, storage resources, computing resources, etc.

To allocate the computing resources, composed information handling systems may be instantiated. A composed information handling system may be a device (the components of which may be distributed across one or more information handling systems) that has exclusive use over a quantity of computing resources. Computing resources from multiple information handling systems may be allocated to a composed information handling system thereby enabling a composed information handling system to utilize computing resources from any number of information handling system for performance of corresponding computer implemented services.

To allocate computing resources, the system may include a system control processor manager. The system control processor manager may obtain composition requests. The composition requests may indicate a desired outcome such as, for example, execution of one or more application, providing of one or more services, etc. The system control processor manager may translate the composition requests into corresponding quantities of computing resources necessary to be allocated to satisfy the intent of the composition requests.

Once the quantities of computing resources are obtained, the system control processor manager may allocate resources of the information handling system to meet the identified quantities of computing resources by instructing system control processors of the information handling systems to prepare and present hardware resource sets of the information handling system to compute resource sets of the information handling systems.

Additionally, embodiments of the invention enable the use of access control managers (e.g., firewalls) managed by either information handling systems and/or by the system control processor manager. The access control manager of an information handling system may manage the access of other components (e.g., other information handling systems) connected to an open network. When a first information handling system requests to use additional resources to generate a composed information handling system, the system control manager determines which information handling systems both (i) provide the requested additional resources and (ii) have enough available networking capabilities to communicate with the first information handling system, and initiates programming of access control managers in the identified information handling systems to enable communication to the first information handling system. In this manner, communication between components in an open network is controlled and monitored, thus preventing access by undesired components to information handling systems. Further, the allocation of the resources and/or additional resources takes into account networking capabilities, e.g., available bandwidth, and, as such, the allocation may be performed in a manner that does impact (or impacts in a limited manner) previous resources and/or additional resources.

FIG. 1.1 shows a system in accordance with one or more embodiments of the invention. The system may include any number of information handling systems (60). The information handling systems (60) may provide computer implemented services. The computer implemented services may include, for example, database services, data storage services, electronic communications services, data protection services, and/or other types of services that may be implemented using information handling systems.

The information handling system of the system of FIG. 1.1 may operate independently and/or cooperatively to provide the computer implemented services. For example, a single information handling system (e.g., 62) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

The type and quantity of computing resources required to provide computer implemented services may vary depending on the type and quantity of computer implemented services to be provided. For example, some types of computer implemented services may be more compute intensive (e.g., modeling) while other computer implemented services may be more storage intensive (e.g., database) thereby having different computing resource requirements for these different services. Consequently, computing resources may be used inefficiently if the quantity of computing resources are over-allocated for the computer implemented services. Similarly, the quality of the provided computer implemented services may be poor or otherwise undesirable if computing resources are under-allocated for the computer implemented services.

In general, embodiments of the invention relate to systems, methods, and devices for managing the hardware resources of the information handling systems (62) and/or other resources (e.g., external resources (30)) to provide computer implemented services. The hardware resources of the information handling systems (62) may be managed by instantiating one or more composed information handling systems using the hardware resources of the information handling systems (62), external resources (30), and/or other types of hardware devices operably connected to the information handling systems (62). Consequently, the computing resources allocated to a composed information handling system may be tailored to the specific needs of the services that will be provided by the composed information handling system.

In one or more embodiments of the invention, the system includes a system control processor manager (50). The system control processor manager (50) may provide composed information handling system composition services. Composed information handling system composition services may include (i) obtaining composition requests for composed information handling systems and (ii) aggregating computing resources from the information handling systems (60) and/or external resources (30) using system control processors to service the composition requests by instantiating composed information handling systems in accordance with the requests. By doing so, instantiated composed information handling systems may provide computer implemented services in accordance with the composition requests.

In one or more embodiments of the invention, the system control processor manager (50) instantiates composed information handling systems in accordance with a three resource set model. As will be discussed in greater detail below, the computing resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a composed information handling system having at least one resource set from each set of the three resource set model.

By logically dividing the computing resources of an information handling system into these resource sets, different quantities and types of computing resource may be allocated to each composed information handling system thereby enabling the resources allocated to the respective information handling system to match performed workloads. Further, dividing the computing resources in accordance with the three set model may enable different resource sets to be differentiated (e.g., given different personalities) to provide different functionalities. Consequently, composed information handling systems may be composed on the basis of desired functionalities rather than just on the basis of aggregate resources to be included in the composed information handling system.

Additionally, by composing composed information handling systems in this manner, the control resource set of each composed information handling system may be used to consistently deploy management services across any number of composed information handling systems. Consequently, embodiments of the invention may provide a framework for unified security, manageability, resource management/composability, workload management, and distributed system management by use of this three resource set model. For additional details regarding the system control processor manager (50), refer to FIG. 4.

In one or more embodiments of the invention, a composed information handling system is a device that is formed using all, or a portion, of the computing resources of the information handling systems (60), the external resources (30), and/or other types of hardware devices operably connected to the information handling systems (60). The composed information handling system may utilize the computing resources allocated to it to provide computer implemented services. For example, the composed information handling system may host one or more applications that utilize the computing resources assigned to the composed information handling system. The applications may provide the computer implemented services.

To instantiate composed information handling systems, the information handling systems (60) may include at least three resource sets including a control resource set. The control resource set may include a system control processor. The system control processor of each information handling system may coordinate with the system control processor manager (50) to enable composed information handling systems to be instantiated. For example, the system control processor of an information handling system may provide telemetry data regarding the computing resources of an information handling system, may perform actions on behalf of the system control processor manager (50) to aggregate computing resources together, may organize the performance of duplicative workloads to improve the likelihood that workloads are completed, and/or may provide services that unify the operation of composed information handling systems.

In one or more embodiments of the invention, compute resource sets of composed information handling systems are presented with bare metal resources by control resource sets even when the presented resources are actually being managed using one or more layers of abstraction, emulation, virtualization, security model, etc. For example, the system control processors of the control resource sets may provide the abstraction, emulation, virtualization, and/or other services while presenting the resources as bare metal resources. Consequently, these services may be transparent to applications hosted by the compute resource sets of composed information handling systems thereby enabling uniform deployment of such services without requiring implementation of control plane entities hosted by the compute resource sets of the composed information handling systems. For additional details regarding the information handling systems (60), refer to FIG. 1.2.

The external resources (30) may be computing resources that may be allocated for use by composed information handling systems. For example, the external resources (30) may include hardware devices that provide any number and type of computing resources. The composed information handling system may use these resources to provide their functionalities. Different external resources (e.g., 32, 34) may provide similar or different computing resources.

The system of FIG. 1.1 may include any number of information handling systems (e.g., 62, 64), any number of external resources (e.g., 32, 34), and any number of system control processor managers (e.g., 50). Any of the components of FIG. 1.1 may be operably connected to any other component and/or other components not illustrated in FIG. 1.1 via one or more networks (e.g., 130). The networks may be implemented using any combination of wired and/or wireless network topologies.

The system control processor manager (50), information handling systems (60), and/or external resources (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), information handling systems (60), and/or external resources (30) described in this application and/or all, or a portion, of the methods illustrated in FIGS. 5.1-5.4. The system control processor manager (50), information handling systems (60), and/or external resources (30) may be implemented using other types of computing devices without departing from the invention. For additional details regarding computing devices, refer to FIG. 7.

While the information handling system (60) has been illustrated and described as including a limited number of specific components, an information handling system in accordance with embodiments of the invention may include additional, fewer, and/or different components without departing from the invention.

Turning to FIG. 1.2, FIG. 1.2 shows a diagram of an information handling system (100) in accordance with one or more embodiments of the invention. Any of the information handling systems (e.g., 60) of FIG. 1.1 may be similar to the information handling system (100) illustrated in FIG. 1.2.

As discussed above, the information handling system (100) may provide any quantity and type of computer implemented services. To provide the computer implemented services, resources of the information handling system may be used to instantiate one or more composed information handling systems. The composed information handling systems may provide the computer implemented services.

To provide computer implemented services, the information handling system (100) may include any number and type of hardware devices including, for example, one or more processors (106), any quantity and type of processor dedicated memory (104), one or more system control processors (114), and any number of hardware resources (118). These hardware devices may be logically divided into three resource sets including a compute resource set (102), a control resource set (108), and a hardware resource set (110).

The control resource set (108) of the information handling system (100) may facilitate formation of composed information handling systems. To do so, the control resource set (108) may prepare any quantity of resources from any number of hardware resource sets (e.g., 110) (e.g., of the information handling system (100) and/or other information handling systems) for presentation to processing resources of any number of computing resource sets (e.g., 102) (e.g., of the information handling system (100) and/or other information handling systems). Once prepared, the control resource set (108) may present the prepared resources as bare metal resources to the processors (e.g., 106) of the allocated computing resources. By doing so, a composed information handling system may be instantiated.

To prepare the resources of the hardware resource sets for presentation, the control resource set (108) may employ, for example, virtualization, indirection, abstraction, and/or emulation. These management functionalities may be transparent to applications hosted by the resulting instantiated composed information handling systems. Consequently, while unknown to the control plane entities of the composed information handling system, the composed information handling system may operate in accordance with any number of management models thereby providing for unified control and management of composed information handling systems. These functionalities may be transparent to applications hosted by composed information handling systems thereby relieving them from overhead associated with these functionalities.

For example, consider a scenario where a compute resource set is instructed to instantiate a composed information handling system including a compute resource set and a hardware resource set that will contribute storage resources to the compute resource set. The compute resource set may virtualize the storage resources of the hardware resource set to enable a select quantity of the storage resources to be allocated to the composed information handling system while reserving some of the storage resources for allocation to other composed information handling systems. However, the prepared storage resources may be presented to the compute resource set as bare metal resources. Consequently, the compute resource set may not need to host any control plane entities or otherwise incur overhead for utilizing the virtualized storage resources.

The compute resource set (102) may include one or more processors (106) operably connected to the processor dedicated memory (104). Consequently, the compute resource set (102) may host any number of executing processes thereby enabling any number and type of workloads to be performed. When performing the workloads, the compute resource set (102) may utilize computing resources provided by the hardware resource set (110) of the information handling system (100), hardware resource sets of other information handling systems, and/or external resources.

The processors (106) of the compute resource set (102) may be operably connected to one or more system control processors (114) of the control resource set (108). For example, the processors (106) may be connected to a compute resource interface (112), which is also connected to the system control processors (114).

The system control processors (114) of the hardware resource set (110) may present computing resources to the processors (106) as bare metal resources. In other words, from the point of view of the processors (106), any number of bare metal resources may be operably connected to it via the compute resources interface (112) when, in reality, the system control processors (114) are operably connected to the processors (106) via the compute resources interface (112). In other words, the system control processors (114) may manage presentation of other types of resources to the compute resource set (102).

By presenting the computing resources to the processors as bare metal resources, control plane entities (e.g., applications) such as hypervisors, emulators, and/or other types of management entities may not need to be hosted (e.g., executed) by the processors (106) for the processors (106) and entities hosted by them to utilize the computing resources allocated to a composed information handling system. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware devices providing the computing resources, which the processors (106) are interacting with via the compute resources interface (112) and/or hardware resources interface (116), discussed below. Consequently, indirection, remapping, and/or other functions required for resource virtualization, emulation, abstraction, or other methods of resource allocation (other than bare metal) and manage may not need to be implemented via the processors (106).

By doing so, any number of functions for a composed information handling system may be automatically performed in a manner that is transparent to the control plane. Accordingly, a composed information handling system may operate in a manner consistent with a unified, consistent architecture or model (e.g., communications model, data storage model, etc.) by configuring the operation of one or more system control processors in a manner consistent with the architecture or model.

In one or more embodiments of the invention, control plane entities utilize computing resources presented through one or more layers of indirection, abstraction, virtualization, etc. In other words, an indirect user of hardware devices and computing resources provided thereby.

In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

The system control processors (114) may present any number of resources operably connected to it (e.g., the hardware resource set (110), other resources operably connected to it via an interface (e.g., hardware resources interface (116), etc.) as bare metal resources to the processors (106) of the compute resource set (102). Consequently, the system control processors (114) may implement device discovery processes compatible with the processors (106) to enable the processors (106) to utilize the presented computing resources.

For example, the hardware resource set (110) may include hardware resources (118) operably connected to the system control processors (114) via a hardware resources interface (116). The hardware resources (118) may include any number and type of hardware devices that provide computing resources. For additional details regarding the hardware resources (118), refer to FIG. 2.

In another example, the system control processors (114) may be operably connected to other hardware resource sets of other information handling systems via hardware resources interface (116), network (130), and/or other system control processors of the other information handling systems. The system control processors may cooperatively enable hardware resource sets of other information handling systems to be prepared and presented as bare metal resources to the compute resource set (102).

In an additional example, the system control processors (114) may be operably connected to external resources via hardware resources interface (116) and network (130). The system control processors (114) may prepare and present the external resources as bare metal resources to the compute resource set (102).

Figure 3:
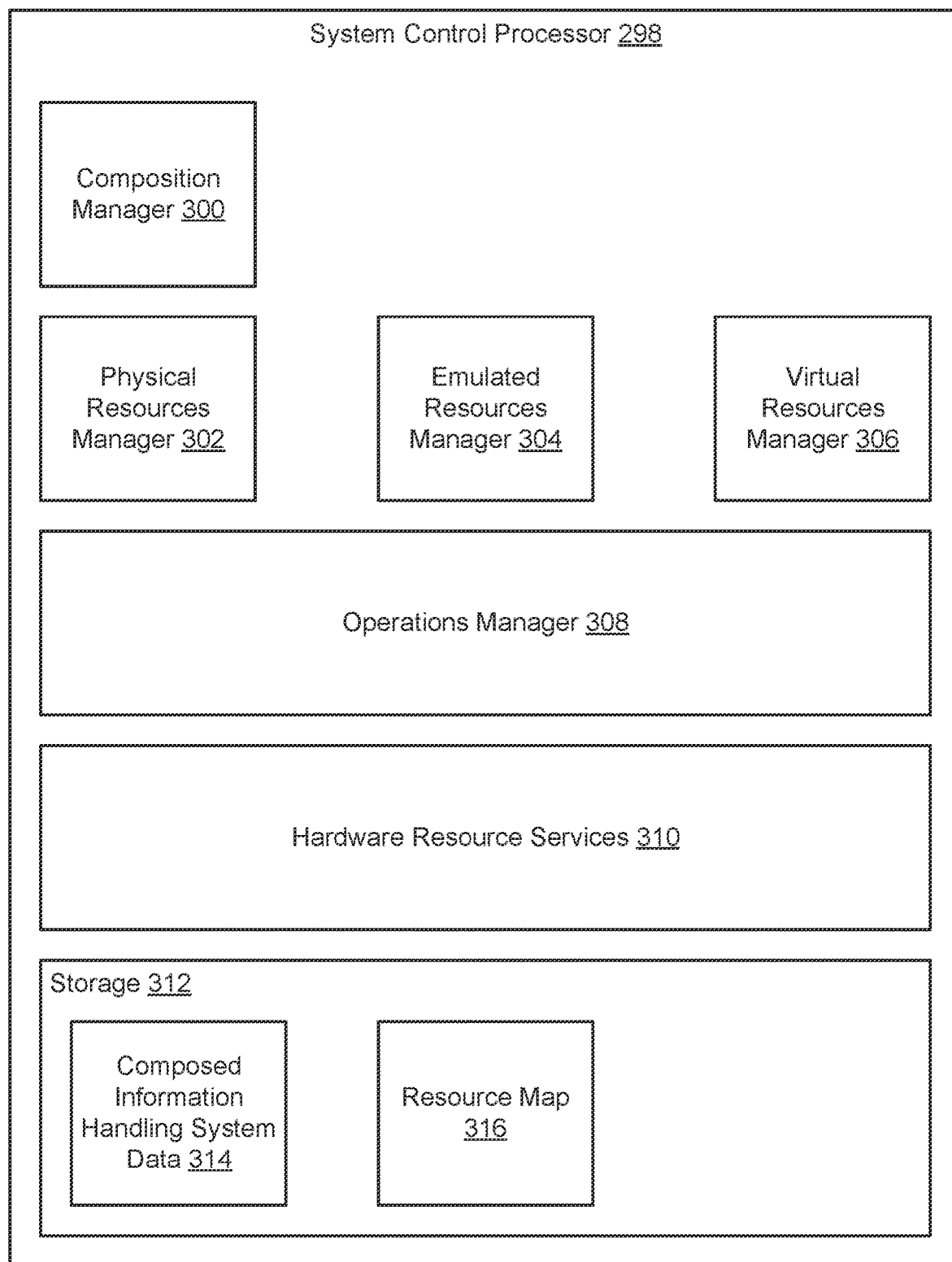
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The hardware resources interface (116) may be implemented using any suitable interconnection technology including, for example, system buses such as compute express links or other interconnection protocols. The hardware resources interface (116) may support any input/output (IO) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116).

In some embodiments of the invention, the compute resource set (102), control resource set (108), and/or hardware resource set (110) may be implemented as separate physical devices. In such a scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware devices of the respective resource sets to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors (106). The system control processors (114) may also support a second network communications connection (e.g., an out-of-band connection) that may be allocated for use by applications hosted by the system control processors (114). The out-of-band connection may be utilized for management and control purposes while the in-band connection may be utilized to provide computer implemented services. These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connections to communicate with other devices to manage (e.g., instantiate, monitor, modify, etc.) composed information handling systems.

The network (130) may correspond to any type of network and may be operably connected to the Internet or other networks thereby enabling the information handling system (100) to communicate with any number and type of other devices.

In one or more embodiments of the invention, access to the network (130) by the information handling systems (100) may be managed by access control managers (ACMs). An ACM of an information handling system may be a system that manages the entities that may access the components of the corresponding information handling system. The programming of the ACMs may be performed by, for example, the information handling system, the system control processor manager (50), and/or any other entity illustrated in FIG. 1.1.

In one or more embodiments of the invention, each of the access control managers is implemented as a firewall. The firewall may be a network security system designed to monitor, control, and/or otherwise manage incoming and outgoing network traffic between the composed information handling system. The firewall may be a logical set of instructions implemented by, for example, a processor of the information handling system (e.g., 62, 64) that enables the information handling system to execute the functionality of the firewall as described throughout the application.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 5.1-5.4. The information handling system (100) may be implemented using other types of computing devices without departing from the invention. For additional details regarding computing devices, refer to FIG. 7.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram of the hardware resources (118) in accordance with one or more embodiments of the invention. As noted above, system control processors of information handling system may present resources including, for example, some of the hardware resources (118) to form a composed information handling system.

The hardware resources (118) may include any number and types of hardware devices that may provide any quantity and type of computing resources. For example, the hardware resources (118) may include storage devices (200), memory devices (202), and special purpose devices (204).

The storage devices (200) may provide storage resources (e.g., persistent storage) in which applications hosted by a composed information handling system may store data including any type and quantity of information. The storage devices (200) may include any type and quantity of devices for storing data. The devices may include, for example, hard disk drives, solid state drives, tape drives, etc. The storage devices (200) may include other types of devices for providing storage resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which a composed information handling system may store data including any type and quantity of information. The memory devices (202) may include any type and quantity of devices for storing data. The devices may include, for example, transitory memory such as random access memory, persistent memory such as enterprise class memory, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units for providing graphics processing resources, compute accelerators for accelerating corresponding workloads performed by composed information handling systems, application specific integrated circuits (ASICs) for performing other functionalities, digital signal processors for facilitating high speed communications, etc. The special purpose devices (204) may include other types of devices for providing other types of computing resources without departing from the invention.

The system control processors of the information handling systems may mediate presentation of the computing resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the computing resources of the hardware resources (118) may be finely, or at a macro level, allocated to different composed information handling systems.

Additionally, the system control processors may manage operation of these hardware devices in accordance with one or more models including, for example, data protection models, security models, workload performance availability models, reporting models, etc. For example, the system control processors may instantiate redundant performance of workloads for high availability services.

The manner of operation of these devices may be transparent to the computing resource sets utilizing these hardware devices for providing computer implemented services. Consequently, even though the resulting composed information handling system control plane may be unaware of the implementation of these models, the composed information handling systems may still operate in accordance with these models thereby providing a unified method of managing the operation of composed information handling systems.

While the hardware resources (118) have been illustrated and described as including a limited number of specific components, local hardware resources in accordance with embodiments of the invention may include additional, fewer, and/or different components without departing from the invention.

As discussed above, information handling systems may include system control processors that may be used to instantiate composed information handling systems. FIG. 3 shows a diagram of a system control processor (298) in accordance with one or more embodiments of the invention. Any of the system control processors included in control resources sets of FIG. 1.2 may be similar to the system control processor (298) illustrated in FIG. 3.

The system control processor (298) may facilitate instantiation and operation of composed information handling systems. By doing so, a system that includes information handling systems may dynamically instantiate composed information handling systems to provide computer implemented services.

To instantiate and operate composed information handling systems, the system control processor (298) may include a composition manager (300), a physical resources manager (302), an emulated resources manager (304), a virtual resources manager (306), an operations manager (308), hardware resource services (310), and storage (312). Each of these components of the system control processor is discussed below.

The composition manager (300) may manage the process of instantiating and operating composed information handling systems. To provide these management services, the composition manager (300) may include functionality to (i) obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain composition requests for composed information handling systems, (iv) based on the composition requests, prepare and present resources as bare metal resources to compute resource sets, (v) instantiate applications in composed information handling systems to cause the composed information handling systems to provide computer implemented services, conform their operation to security models, etc., (vi) manage the operation of the composed information handling systems by, for example, duplicating performance of workloads to improve the likelihood that the output of workloads are available, (vii) add/remove/modify resources presented to the compute resource sets of composed information handling systems dynamically in accordance with workloads being performed by the composed information handling systems, and/or (viii) coordinate with other system control processors to provide distributed system functionalities. By providing the above functionalities, a system control processor in accordance with one or more embodiments of the invention may enable distributed resources from any number of information handling systems to be aggregated into a composed information handling system to provide computer implemented services.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or information regarding hardware components of the information handling system that may be allocated to form a composed information handling systems.

The composition manager (300) may obtain composition requests from other entities (e.g., management entities tasked with instantiating composed information handling systems), as pre-loaded instructions present in storage of the system control processor, and/or via other methods. The composition requests may specify, for example, the types and quantities of computing resources to be allocated to a composed information handling system.

In one or more embodiments of the invention, the composition requests specify the computing resource allocations using an intent based model. For example, rather than specifying specific hardware devices (or portions thereof) to be allocated to a particular compute resource set to obtain a composed information handling system, the resource requests may only specify that a composed information handling system is to be instantiated having predetermined characteristics, that a composed information handling system will perform certain workloads or execute certain applications, and/or that the composed information handling system be able to perform one or more predetermined functionalities. In such a scenario, the composition manager may decide how to instantiate the composed information handling system (e.g., which resources to allocate, how to allocate the resources (e.g., virtualization, emulation, redundant workload performance, data integrity models to employ, etc.), to which compute resource set(s) to present corresponding computing resources, etc.).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the composed information handling systems, security models to be employed by the composed information handling systems, communication models to be employed by the composed information handling systems, services to be provided to the composed information handling systems, user/entity access credentials for use of the composed information handling systems, and/or other information usable to place the composed information handling systems into states in which the composed information handling systems provide desired computer implemented services.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

Additionally, the system control processors may take into account an importance of completion of workloads when preparing and presenting resources. For example, some workloads that may be performed by various hardware devices may be critical (e.g., high availability workloads) to the computer implemented services to be provided by a composed information handling system. In such a scenario, the system control processor may over allocate resources (e.g., beyond that requested by a compute resource set) for performance of the workloads so that at least two instances of the workloads can be performed using duplicative resources. By doing so, it may be more likely that at least one of the workloads will be completed successfully. Consequently, the system control processor may provide the output of one of the workloads to compute resource sets of a composed information handling system.

When presenting the resources to the compute resource sets, the system control processor (298) may present the resources using an emulated data plane. For example, the system control processors (298) may receive bare metal communications (e.g., IO from the processors) and respond in a manner consistent with responses of corresponding bare metal devices (e.g., memory). When doing so, the system control processor (298) may translate the communications into actions. The actions may be provided to the hardware devices used by the system control processor (298) to present the bare metal resources to the compute resource set(s). In turn, the hardware devices may perform the actions which results in a composed information handling system providing desired computer implemented services.

In some scenarios, multiple system control processors may cooperate to present bare metal resources to a compute resource set. For example, a single information handling system may not include sufficient hardware devices to present a quantity and/or type of resources to a compute resource set as specified by a composition request (e.g., present two storage devices to a compute resource set when a single information handling system only includes a single storage device). In this scenario, a second system control processor of a second information handling system operably connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling systems may be aggregated to present a desired quantity of resources to compute resource set(s) to form a composed information handling system.

By forming composed information handling systems as discussed above, embodiments of the invention may provide a system that is able to effectively utilize distributed resources across a range of devices to provide computer implemented services.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these commands and the resources available to service these bare metal commands/communications.

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

The functionalities of the physical resources manager (302), emulated resources manager (304), and virtual resources manager (306) may be utilized in isolation and/or combination to provide bare metal resources to compute resource sets. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding TO from compute resource sets to hardware devices), bare metal resource addressing of virtualized resources, and/or as emulated resources compatible with the hardware components of the compute resource set.

The functionality of the physical resources manager (302), emulated resources manager (304), and virtual resources manager (306) may be invoked using any communication model including, for example, message passing, state sharing, memory sharing, etc.

The operations manager (308) may manage the general operation of the system control processor (298). For example, the operations manager (308) may operate as an operating system or other entity that manages the resources of the system control processor (298). The composition manager (300), physical resources manager (302), emulated resources manager (304), virtual resources manager (306), and/or other entities hosted by the system control processor (298) may call or otherwise utilize the operations manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.2). For example, the hardware resource services (310) may include driver functionality to appropriately communicate with the hardware devices of hardware resource sets. The hardware resource services (310) may be invoked by, for example, the operations manager (308).

When providing their functionalities, any of the aforementioned components of the system control processor (298) may perform all, or a portion, of the methods illustrated in FIGS. 5.1-5.4.

The system control processor (298) may be implemented using computing devices. The computing devices may be, for example, an embedded computing device such as a system on a chip, a processing device operably coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 5.1-5.4. The system control processor (298) may be implemented using other types of computing devices without departing from the invention. For additional details regarding computing devices, refer to FIG. 7.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, the composition manager (300), physical resources manager (302), emulated resources manager (304), virtual resources manager (306), operations manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), physical resources manager (302), emulated resources manager (304), virtual resources manager (306), operations manager (308), and/or hardware resource services (310). The composition manager (300), physical resources manager (302), emulated resources manager (304), virtual resources manager (306), operations manager (308), and/or hardware resource services (310) may be implemented using other types of hardware devices without departing from the invention.

In one or more embodiments of the invention, the composition manager (300), physical resources manager (302), emulated resources manager (304), virtual resources manager (306), operations manager (308), and/or hardware resource services (310) are implemented using a processor adapted to execute computing code stored on a persistent storage (e.g., as part of the system control processor (298) or operably connected to the system control processor (298) thereby enabling processors of the system control processor (298) to obtain and execute the computing code) that when executed by the processor performs the functionality of the composition manager (300), physical resources manager (302), emulated resources manager (304), virtual resources manager (306), operations manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed information handling system data (314) and a resource map (316). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may further include information regarding management models employed by system control processors. For example, the composed information handling system data (314) may include information regarding duplicative data stored for data integrity purposes, redundantly performed workloads to meet high availability service requirements, encryption schemes utilized to prevent unauthorized access of data, etc.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware devices, virtualized devices, etc.) available for allocation and/or that are already allocated to composed information handling systems. The resource map (316) may be used to provide data to management entities such as system control processor managers.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316) to cause the information included in the resource map (316) to reflect the state of the information handling system and/or other information handling systems.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
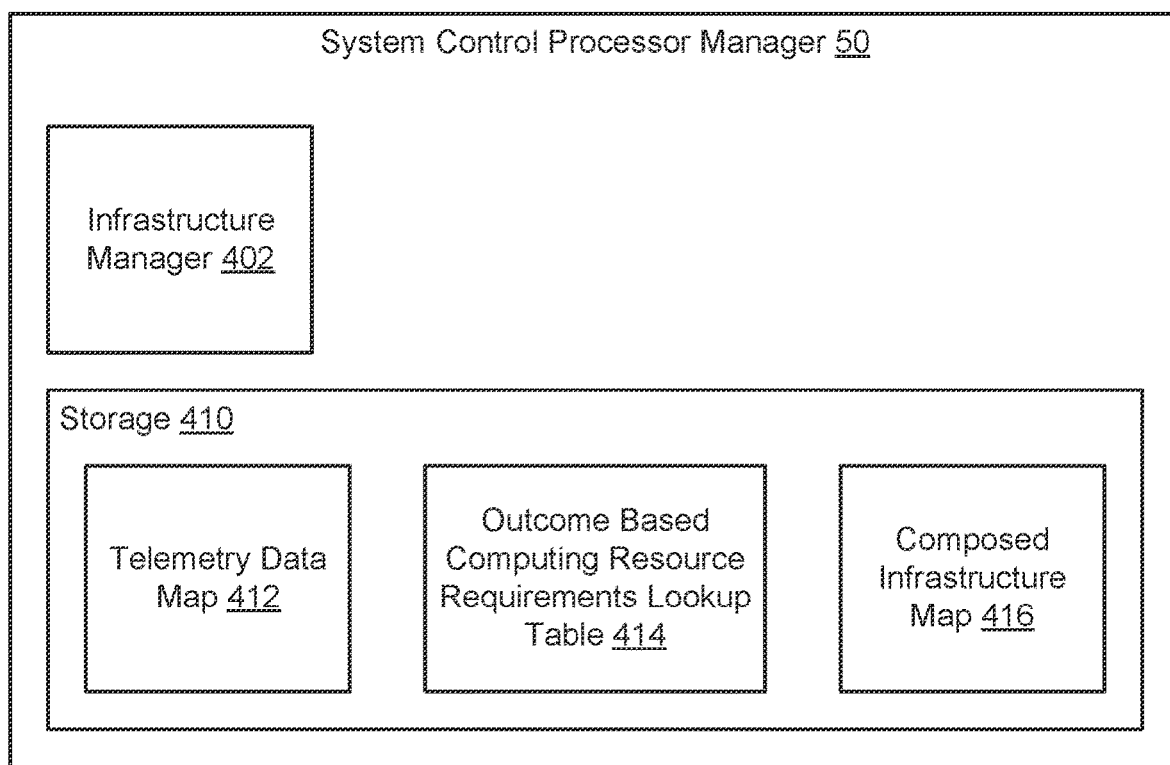
FIG. 4 shows a diagram of a system control processor manager in accordance with one or more embodiments of the invention.

As discussed above, a system control processor manager may cooperate with system control processors of control resource sets to instantiate composed information handling systems by presenting computing resources from hardware resource sets to processors of compute resource sets. FIG. 4 shows a diagram of the system control processor manager (10) in accordance with one or more embodiments of the invention.

The system control processor manager (10) may manage the process of instantiating composed information handling systems. To do so, the system control processor manager (10) may include an infrastructure manager (402) and storage (410). Each of these components is discussed below.

The infrastructure manager (402) may provide composition services. Composition services may include obtaining composition requests for composed information handling systems, determining the resources to allocate to instantiate composed information handling systems, and cooperating with system control processors to allocate the identified resources. By doing so, the infrastructure manager (402) may cause any number of computer implemented services to be provided using the composed information handling systems.

To determine the resources to allocate to composed information handling systems, the infrastructure manager (402) may employ an intent based model that translates an intent expressed in a composition request to one or more allocations of computing resources. For example, the infrastructure manager (402) may utilize an outcome based computing resource requirements lookup table (414) to match an expressed intent to resources to be allocated to satisfy that intent. The outcome based computing resource requirements lookup table (414) may specify the type, quantity, method of management, and/or other information regarding any number of computing resources that when aggregated will be able to satisfy a corresponding intent. The infrastructure manager (402) may identify resources for allocation to satisfy composition requests via other methods without departing from the invention.

To cooperate with the system control processors, the infrastructure manager (402) may obtain telemetry data regarding the computing resources of any number of information handling systems and/or external resources that are available for allocation. The infrastructure manager (402) may aggregate this data in a telemetry data map (412) which may be subsequently used to identify resources of any number of information handling systems and/or external resources to satisfy composition requests (e.g., instantiate one or more composed information handling systems to meet the requirements of the composition requests).

When the infrastructure manager (402) identifies the computing resources to be allocated, the infrastructure manager (402) may communicate with any number of system control processors to implement the identified allocations. For example, the infrastructure manager (402) may notify a system control processor of a control resource set that portions of a hardware resource set are to be allocated to a compute resource set to instantiate a composed information handling system. The system control processor may then take action (e.g., prepare the portion of the hardware resource set for presentation to a processor of the compute resource set) in response to the notification.

As composed information handling systems are instantiated, the infrastructure manager (402) may add information reflecting the resources allocated to composed information handling systems, the workloads being performed by the composed information handling systems, and/or other types of information to a composed infrastructure map (416). The infrastructure manager (402) may utilize this information to, for example, decide whether computing resources should be added to or removed from composed information handling system. Consequently, computing resources may be dynamically re-provisioned over to meet changing workloads imposed on composed information handling systems.

In one or more embodiments of the invention, the infrastructure manager (402) is implemented using a hardware device including circuitry. The hardware device may be, for example, a digital signal processor, a field programmable gate array, or an application specific integrated circuit. The circuitry may be adapted to cause the hardware device to perform the functionality of the infrastructure manager (402). The infrastructure manager (402) may be implemented using other types of hardware devices without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware devices for processing digital information without departing from the invention.

When providing its functionality, the infrastructure manager (402) may perform all, or a portion, of the methods illustrated in FIGS. 5.1-5.4.

In one or more embodiments disclosed herein, the storage (410) is implemented using physical devices that provide data storage services (e.g., storing data and providing copies of previously stored data). The devices that provide data storage services may include hardware devices and/or logical devices. For example, storage (410) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (410) may include a memory device (e.g., a dual in line memory device) in which data is stored and from which copies of previously stored data are provided. In another example, storage (410) may include a persistent storage device (e.g., a solid-state disk drive) in which data is stored and from which copies of previously stored data is provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (410) may store data structures including, for example, the telemetry data map (412), outcome based computing resource requirements lookup table (414) and the composed infrastructure map (416). These data structures may be maintained by, for example, the infrastructure manager (402). For example, the infrastructure manager (402) may add, remove, and/or modify information included in these data structures to cause the information included in these data structure to reflect the state of any number of information handling systems, external resources, and/or composed information handling systems.

Any of these data structures may be implemented using, for example, lists, tables, unstructured data, databases, etc. While illustrated in FIG. 4 as being stored locally, any of these data structures may be stored remotely and may be distributed across any number of devices without departing from the invention.

While the storage (410) has been illustrated and described as including a limited number and type of data, a storage in accordance with embodiments of the invention may store additional, less, and/or different data without departing from the invention.

While the system control processor manager (10) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed information handling systems. FIGS. 5.1-5.4 show methods that may be performed by components of the system of FIG. 1.1 to manage composed information handling systems.

FIG. 5.1 shows a flowchart of a method in accordance with one or more embodiments of the invention. The method depicted in FIG. 5.1 may be performed to obtain resource availability and a network connectivity topology in accordance with one or more embodiments of the invention. The method shown in FIG. 5.1 may be performed by, for example, a system control processor manager (e.g., 50, FIG. 1.1). Other components of the system in FIGS. 1.1-4 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, communication with a set of information handling systems is initiated using access management systems. In one or more embodiments of the invention, the communication includes sending messages to each access control manager (ACM) of the set of information handling system to ensure that the ACMs are programmed to enable communication between the corresponding information handling system and the system control processor manager.

In one or more embodiments of the invention, the ACMs are firewalls that each, at least initially, only permit a corresponding information handling system to communicate with the system control processor manager. As resource allocation requests (discussed in FIG. 5.3) are serviced by the system control processor manager, the ACMs may be programmed to enable communication with other information handling systems such that composed information handling systems may be instantiated in accordance with the resource allocation requests.

In step 502, resource availability requests are sent to each system control processor in the set of information handling systems. In one or more embodiments of the invention, a resource availability request requests each information handling system to provide its available resources. The available resources may be resources of an information handling system that have not been allocated to a composed information handling system.

Further, the resource availability request may specify providing network availability of each information handling system. The network availability of an information handling system may be determined based on a total network capability (e.g., a total network bandwidth) and the amount of the total network capability that is being used. The difference between the total network capability and the amount of the total network capability that is being used is the network availability.

In step 504, resource availability responses are obtained that each specify available compute resource sets and hardware resource sets. Further, the resource availability responses may specify the network availability of the corresponding information handling systems. For example, an information handling system may have a network bandwidth of X, and 30% of the network bandwidth may be utilized for providing additional resources to composed information handling systems. In such example, the resource availability response, in addition to specifying the available resources, specifies the 70% of X as available network bandwidth of the information handling system.

In step 506, a network connectivity topology is obtained based on connections between the information handling systems in the set. In one or more embodiments of the invention, the network connectivity topology is a data structure that provides an overall view of the network availability of each information handling system. Further, the network connectivity topology may specify which information handling systems are communicating with each other to instantiate composed information handling systems. The network connectivity topology may be generated based on the obtained resource availability responses.

FIG. 5.2 shows a flowchart of a method in accordance with one or more embodiments of the invention. The method depicted in FIG. 5.2 may be performed to generate a composed information handling system based on a composition request in accordance with one or more embodiments of the invention. The method shown in FIG. 5.2 may be performed by, for example, a system control processor (e.g., 114, FIG. 1.2). Other components of the system in FIGS. 1.1-4 may perform all, or a portion, of the method of FIG. 5.2 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

In step 511, a composition request is obtained for a composed information handling system. The composition request may be obtained using any method without departing from the invention. For example, the composition request may be obtained as part of a message from another entity operably connected to a system control processor manager. In another example, the composition request may be locally stored in a storage of a system control processor manager.

The composition request may be a data structure specifying that the composed information handling system is to be instantiated. As discussed with respect to FIG. 3, the composition request may be specific (i.e., includes a listing of resources to be allocated to the composed information handling system) or intent based (i.e., a desired outcome without specifying the resources to be allocated). The composition request may include any type and quantity of information usable to determine how to instantiate a composed information handling system.

In one or more embodiments of the invention, the composition request includes a list of computing resources to be allocated to the composed information handling system. For example, the composition request may specify computing resources, memory resources, storage resources, graphics processing resources, compute acceleration resources, communications resources, etc. The list may include any type and quantity of computing resources.

In one or more embodiments of the invention, the composition request specifies how the computing resources are to be presented. For example, the composition request may specify virtualization, emulation, etc. for presenting the computing resources.

In one or more embodiments of the invention, the composition request specifies how the resources used to present the computing resources are to be managed (e.g., a management model such as data integrity, security, management, usability, performance, etc.). For example, the composition request may specify levels of redundancy for data storage, data integrity to be employed (e.g., redundant array of independent disks (RAID), error correction code (ECC), etc.), levels of security to be employed for resources (e.g., encryption), and/or other information that specifies how system control processors are to utilize resources for presentation of resources to composed information handling systems. The methods employed by the system control processors may be transparent to the composed information handling systems because the resources may be presented to the compute resource sets of the composed information handling systems as bare metal resources while the system control processors provide the management functionality.

In one or more embodiments of the invention, the composition request includes a list of applications to be hosted by the composed information handling system. The list may include any type and quantity of applications.

In step 512, at least one compute resource set having computing resources and one hardware set having hardware resources specified by the composition request are identified. The at least one compute resource set and the at least one hardware set may be identified by matching the computing resources specified by the composition request to at least one compute resource set having those resources using a resource map (316, FIG. 3).

For example, the resource map (316, FIG. 3) may specify a list of compute resource sets, identifiers of control resource sets that manage the listed compute resource sets, and the hardware devices of the listed compute resource sets. By matching the computing resources specified by the composition request to the hardware devices specified in the list, the compute resource set corresponding to the listed hardware devices may be identified as the at least one compute resource set.

In step 513, a determination is made about whether the information handling system is capable of servicing the composition request locally. In one or more embodiments of the invention, the determination is based on whether all resources identified in step 512 (e.g., the hardware resources and the computing resources) are available in the information handling system. In other words, the information handling system is capable of servicing the composition request if all identified resources are available resources in the information handling system. In contrast, if any of the identified resources required to service the composition request are not available locally (i.e., not available in the information handling system), then the information handling system is not capable of servicing the composition request locally. If the information handling system is capable of servicing the composition request locally, the method proceeds to step 517; otherwise, the method proceeds to step 514.

In step 514, following the determination that the information handling system is not capable of servicing the composition request locally, the available resources in the information handling system are allocated to the composed information handling system. In one or more embodiments of the invention, the portion of the identified resources that are available locally are allocated by updating the resource map and telemetry data map to specify the available resources as being utilized for the composed information handling system of the composition request.

In step 515, a resource allocation request is sent to the system control processor manager for access to additional resources. In one or more embodiments of the invention, the resource allocation request specifies obtaining access to additional resources from at least a second information handling system. The additional resources may be the remaining portion of the identified resources that are not available in the first information handling system. The system control processor manager may process the resource allocation request in accordance with FIG. 5.4.

In one or more embodiments of the invention, the resource allocation request further specifies a desired network bandwidth. In such embodiments in which the desired network bandwidth is not specified, an operational network bandwidth is predicted based on the resources specified in the resource allocation request and the telemetry data map. For example, the telemetry data map may specify each resource type and a corresponding expected operational network bandwidth. The expected operational network bandwidths of the resources specified in the resource allocation request may be used to determine the desired network bandwidth of the resource allocation request.

In step 516, a notification for access to at least the second information handling system is obtained to complete the hardware resource set. In one or more embodiments of the invention, the notification specifies access to at least the second information handling system. The access may be direct communication or proxy communication via the system control processor manager without departing from the invention.

In step 517, management services for the hardware resource set are set up using at least one control resource set to obtain logical hardware resources. The management services may include, for example, virtualization, emulation, abstraction, indirection, and/or other type of services to meet the requirements of data integrity, security, and/or management models. The control resource set may provide management services to the at least one hardware resource set identified in step 506.

The hardware resource set may include the available resources as provided by the first information handling system and, if applicable, the additional resources provided via the communication with at least the second information handling system.

To setup the management services, the system control processor manager may cooperate with the at least one control resource set. For example, the system control processor manager may generate instructions for implementing the management services, encapsulate the instructions in a message, and send the message to one or more system control processors of the at least one control resource set. In response to receiving the message, the system control processors may implement the instructions thereby implementing any number of management services such as virtualization, emulation, etc.

The system control processor manager may also include identification information for the system control processors that will cooperate in presenting resources as part of instantiating the composed information handling system. Consequently, the system control processors of control resource sets that will facilitate bare metal presentation of resources to processors of compute resource sets of the composed information handling system may be able to identify each other, communicate with one another, etc.

Setting up management services for the hardware resource set may include, for example, preparing translation, indirection, or abstraction tables used to translate logical addresses provided by compute resource sets to physical addresses utilized by hardware devices of the hardware resource set.

In another example, setting up management services may include, if the type of the resource allocation is a portion of a virtualized resource, making a call to a virtualization resources manager to allocate the portion of resources from an existing virtualized resource or by instantiating a new virtualized resource and allocating the portion from the new virtualized resource.

In a still further example, if the type of the resource allocation requires an emulated resource, providing management services may include instantiating a corresponding emulation layer between a hardware device of the hardware resource set and the compute resource set. Consequently, bare metal communications between the compute resource set and the hardware device used to present the bare metal resource to the compute resource set may be automatically translated by the system control processor.

Setting up management services may further include modifying the operation of one or more devices to provide, for example, data integrity functionality (e.g., RAID, ECC, etc.), security functionality (e.g., encryption), and/or other functionalities that are transparent to the composed information handling system.

In step 518, the logical hardware resources are presented to the at least one compute resource set as bare metal resources to instantiate the composed information handling system.

To present the logical hardware resources, the system control processor manager may instruct the system control processors of the at least control resource set to make the bare metal resources discoverable. For example, the at least one control resource set may send a bare metal communication to one or more processors of the at least one compute resource set to cause the processors to discover the presence of the presented bare metal resources. By doing so, the processors may then begin to utilize the logical hardware resources as bare metal resources resulting in a composed information handling system having all of the resources necessary to provide desired computer implemented services.

FIG. 5.3 shows a flowchart of a method in accordance with one or more embodiments of the invention. The method depicted in FIG. 5.3 may be performed to initiate access between SCPs via the SCP manager in accordance with one or more embodiments of the invention. The method shown in FIG. 5.3 may be performed by, for example, a system control processor manager (e.g., 50, FIG. 1.1). Other components of the system in FIGS. 1.1-4 may perform all, or a portion, of the method of FIG. 5.3 without departing from the invention.

While FIG. 5.3 is illustrated as a series of steps, any of the steps may be omitted, performed in a different order, additional steps may be included, and/or any or all of the steps may be performed in a parallel and/or partially overlapping manner without departing from the invention.

In step 520, a resource allocation request is obtained from a system control processor for additional resources. In one or more embodiments of the invention, the resource allocation request is the resource allocation request specified in step 515 of FIG. 5.2.

In step 522, a network connectivity analysis is performed on the set of information handling systems based on the network topology to identify a second information handling system that may satisfy the resource allocation request. In one or more embodiments of the invention, the network connectivity analysis includes analyzing the network connectivity topology to identify a network availability of information handling systems, determining that the second information handling system: (i) has the available resources to satisfy the resource allocation request as specified in the resource availability responses of FIG. 5.1, and (ii) has the network availability to communicate with the first information handling system as specified in the network connectivity topology. In various embodiments of the invention, the allocation does not take into account network availability (i.e., (ii)).

In one or more embodiments of the invention, the network availability of the information handling systems is determined based on bandwidth specifications (e.g., the network bandwidth usage is compared to a manufacturer-specified network bandwidth capabilities of the network interfaces in the information handling system). The information handling system (e.g., the second information handling system) with the highest network availability may be selected.

In one or more embodiments of the invention, multiple information handling systems may provide the desired network availability. In such embodiments, the information handling system may be selected based on any factors such as, for example, at random, based on the highest network bandwidth, or based on the number of composed information handling systems executing in the information handling systems. Other factors may be considered to select from the multiple information handling systems without departing from the invention.

In step 524, an access control management request is sent to a second system control processor of the second information handling system. The access control management request may specify allowing communication between the resources in the second information handling system and the first information handling system via the SCP manager. The access control management request may specify programming the access control manager on the second information handling system to enable proxy communication to the first information handling system via the system control processor manager. In this manner, all communication between the first and the second information handling system occurs through the system control processor manager.

In one or more embodiments of the invention, the access control management request further specifies programming at least a portion of the network interfaces of the second system control processor to specify segregating network traffic between the portion of the network interfaces to be limited to the composed information handling system. In this manner, the network availability of the second information handling system is maintained throughout the operation of the composed information handling system.

In step 526, a response from the second system control processor is transmitted to the system control processor for enabled access to the resources. In one or more embodiments of the invention, the response includes the notification specified in step 516 of FIG. 5.2. The notification may specify the enabled communication with the second information handling system via the system control processor manager.

FIG. 5.4 shows a flowchart of a method in accordance with one or more embodiments of the invention. The method depicted in FIG. 5.4 may be performed to initiate direct access between SCPs in accordance with one or more embodiments of the invention. The method shown in FIG. 5.4 may be performed by, for example, a system control processor manager (e.g., 50, FIG. 1.1). Other components of the system in FIGS. 1.1-4 may perform all, or a portion, of the method of FIG. 5.4 without departing from the invention.

While FIG. 5.4 is illustrated as a series of steps, any of the steps may be omitted, performed in a different order, additional steps may be included, and/or any or all of the steps may be performed in a parallel and/or partially overlapping manner without departing from the invention.

In step 540, a resource allocation request is obtained from a system control processor for additional resources. In one or more embodiments of the invention, the resource allocation request is the resource allocation request specified in step 515 of FIG. 5.2.

In step 542, a network connectivity analysis is performed on the set of information handling systems based on the network topology to identify a second information handling system that may satisfy the resource allocation request. In one or more embodiments of the invention, the network connectivity analysis of step 542 is similar to that of step 522 of FIG. 5.3.

In step 544, an access control management request is sent to a second system control processor of the second information handling system. The access control management request may specify allowing direct communication between the resources in the second information handling system and the first information handling system. The access control management request may specify programming the access control manager on the second information handling system to enable direct communication to the first information handling system. In this manner, all communication between the first and the second information handling system occurs without the need of proxy communication via the system control processor manager.

In step 546, a response from the second system control processor is transmitted for enabled access to the resources. In one or more embodiments of the invention, the response includes the notification specified in step 516 of FIG. 5.2. The notification may specify the enabled direct communication with the second information handling system.

To further clarify embodiments of the invention, a non-limiting example is provided in FIGS. 6.1-6.3. FIGS. 6.1 and 6.3 show a system similar to that illustrated in FIG. 1.1. Actions performed by components of the illustrated system are illustrated by numbered, circular boxes interconnected, in part, using dashed lines. For the sake of brevity, only a limited number of components of the system of FIG. 1.1 is illustrated in FIGS. 6.1 and 6.3. FIG. 6.2 shows diagrams of examples of data structures utilized by the example system of FIGS. 6.1 and 6.3.

Example

Consider a scenario as illustrated in FIG. 6.1 in which a system control manager (600), at step 1, initiates communication with four information handling systems (IHSs) (610, 620, 630, and 640). The communication includes sending requests to access control managers (ACMs) (618, 628, 638, 648). The communication further includes sending resource availability requests to the corresponding system control processors (e.g., 614, 624) of the IHSs (610, 620, 630, 640). For the sake of brevity, the system control processors of IHS C (630) and IHS D (640) are not illustrated in FIG. 6.1 or 6.3.

In response to the resource availability requests, each system control processor (e.g., 614, 624), at step 2, send resource availability responses that specify the available computing resources and hardware resources to be used for composing composable information handling systems. The system control processors send network bandwidth information for each port in the respective IHSs (610, 620, 630, 640). The available resources and the network information may be stored in a telemetry data map illustrated in FIG. 6.2. Further, the ACMs (618, 628, 638, 648) are programmed to enable access to the system control processor manager (600).

As seen in FIG. 6.2, the telemetry data map (650) includes entries (652, 654, 656, 658) that specify the resources corresponding network port connection. For example, the telemetry data map (650) includes a first entry (652) associated with information handling system A (610, FIG. 6.1) which specifies that the information handling system A includes a hardware resource set (650) that includes a solid state disk having four terabytes of storage space (652A), network port A having 60 Megabits per second (Mbps) of available bandwidth (652B), and network port B having 50 Mbps (652C). Similarly, the telemetry data map (650) includes a second entry (654) associated with information handling system B (620, FIG. 6.1) which specifies that the information handling system B includes a hardware resource set (650) that includes a graphics processing unit (654A), network port C having 40 Mbps of available bandwidth (654B), and network port D having 60 Mbps (654C); further, a third entry (656) associated with information handling system C (630, FIG. 6.1) specifies that the information handling system C includes a hardware resource set that includes a solid state disk having eight terabytes of storage space (656A), network port E having 40 Mbps of available bandwidth (656B), and network port F having 0 Mbps (656C); and a fourth entry (658) associated with information handling system D (640, FIG. 6.1) specifies that the information handling system D includes a hardware resource set that includes a second graphics processing unit (658A), network port G having 0 Mbps of available bandwidth (658B), and network port H having five Mbps (658C).

Turning to FIG. 6.3, at step 3, a client sends a composition request to the system control processor (614) of IHS A (610). The composition request specifies composing a composed information handling system that includes a compute resource set, a solid state disk with at least three TB of space, and a graphics processing unit. Based on the information in the resource map of IHS A (610) (which is a subset of the information shown in FIG. 6.2, the system control processor (614), at step 4, determines that a composed information handling system should be instantiated utilizing compute resource set A (612), system control processor (614), solid state disk (616) of information handling system A (610), and an additional graphics processing unit that is not associated with IHS A (610). Additionally, to meet the storage space required for the virtual reality application, the system control processor (614) determines that resources from another information handling system are required.

Based on this determination, the system control processor (614), aware of its current lack of access to a graphics processing unit, at step 5, sends a resource allocation request to the system control processor manager (600) that specifies obtaining an additional graphics processing unit.

At step 6, the system control processor manager (600) analyzes the telemetry data map (650, FIG. 6.2) to determine that IHS B (620) and IHS D (640) both include the graphics processing unit to satisfy the resource allocation request. However, due to the limited bandwidth of IHS D (640) as specified in the telemetry data map (650, FIG. 6.2), enabling access to IHS D (640) would severely limit the accessibility of the network ports of IHS D (640) between other components. As such, the system control processor manager (600) selects the graphics processing unit of IHS B (620) to service the resource allocation request due to the higher network availability of IHS B (620).

At step 7, the system control processor manager sends an access control management request to IHS B (620) that specifies programming ACM B (628) to enable access by IHS A (610). At step 8, ACM B (628) is programmed according to the access control management request. The system control processor (614) of IHS A (610) is notified of the access. Further, network port C of IHS B (620) is allocated to the production of the composed system such that network port C is dedicated only to enabling communication between the system control processor (614) of IHS A (610) and the graphics processing unit of IHS B (620).

At step 9, the system control processor (614) determines that only three terabytes of the solid state disk (616) are needed to be presented to the compute resource set A (612). Consequently, at step 9, the system control processor (614) instantiates the solid state disk (616) as a virtualized disk so that, at step 10, only three terabyte of the four terabytes of the solid state disk (616) can be presented to the compute resource set A (612).

Further, at step 11, the system control processor (614) sends a message to the system control processor (624) of the information handling system B (620) requesting that the graphics processing unit (626) be prepared for presentation to the compute resource set A (612). In response to the request, in step 12, the system control processor (624) of IHS B (620) sets the state of the graphics processing unit (626) consistent with drivers employed by the system control processor (614) for communications purposes.

Finally, at step 13, the prepared resources are presented by the system control processor (614) as bare metal resources to the compute resource set A (612). Consequently, at step 14, the compute resource set A (612) is able to utilize the prepared resources without being required to take into account the methods by which the underlying hardware resources are being managed.

End of Example

Thus, as illustrated in FIGS. 6.1-6.3, embodiments of the invention may provide a system that enables improved computer implemented services to be provided using dynamically instantiated composed information handling systems via efficient computing resource allocation.

Figure 7:
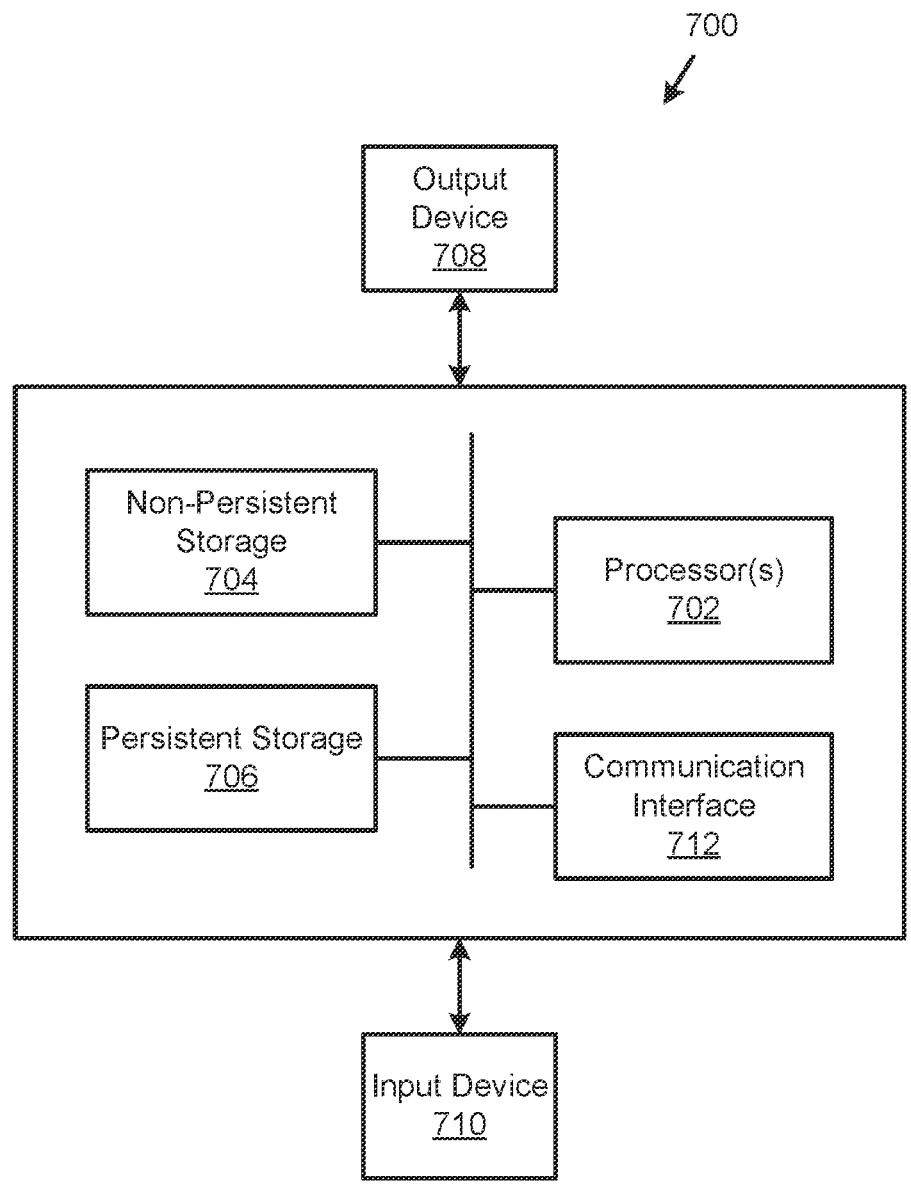
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a system and method for dynamically instantiated composed information handling systems. Specifically, embodiments of the invention may provide a system control processor manager which instantiates composed information handling systems by managing the operation of system control processors and monitoring network connectivity between information handling systems to determine whether an information handling system has the network availability (e.g., network bandwidth) to communicate with the information handling system. Further, because information handling systems utilize access control managers to severely limit the access of components in an open network to the information handling systems, the risk of undesired components accessing and/or damaging composed information handling systems via the open network is greatly reduced.

Thus, embodiments of the invention may address the problem of resource allocation for composed systems. For example, by utilizing a system control processor manager, the limited resources of multiple information handling systems may be efficiently allocated to provide desired computer implemented services.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A system for providing computer implemented services using information handling systems, comprising:
 a first information handling system of the information handling systems comprising a system control processor and at least one compute resource set; and
 a system control processor manager,
 wherein the system control processor is programmed to:
  obtain a composition request for a composed information handling system;
  make a first determination that the first information handling system is not capable of servicing the composition request; and
  based on the first determination:
   allocate, an available resource on the first information handling system to the composed information handling system;
   sending a resource allocation request to the system control processor manager for access to an additional resource;
   obtain, in response to the allocation request, a notification for access to a second information handling system of the information handling systems that provides the available resource;
   setup management services for available resource and the additional resource to obtain logical hardware resources; and
   present the logical hardware resources to the at least one compute resource set as bare metal resources,
 wherein the system control processor manager is programmed to:
  initiate communication with the system control processor via a first access control manager,
  wherein the first access control manager is a firewall, wherein the firewall only permits the first information handling system to communicate with the system control processor manager until the available resource is allocated to the composed information handling system;
  after initiating communication with the system control processor:
   send a resource availability request to the first information handling system;
   obtain a resource availability response from the first information handling system, wherein the resource availability response specifies at least a network availability of the first information handling system;
   obtain, using at least the resource availability response from the first information handling system, a network connectivity topology.

2. The system of claim 1, wherein the at least one compute resource set comprises the system control processor, wherein the system control processor is further programmed to provide virtualization services for the hardware resources when providing the management services.

3. The system of claim 1, wherein the network availability specifies a current bandwidth usage of the first information handling system.

4. The system of claim 1, wherein the system control processor manager is further programmed to:
obtain the resource allocation request;
identify, based on network connectivity analysis, the second information handling system as being able to satisfy the resource allocation request using the additional resource; and
transmit the notification, via the system control processor manager, to the first information handling system.

5. The system of claim 4, wherein the system control processor manager is further programmed to, after transmitting the notification to the system control processor, proxy communication between the first information handling system and the second information handling system to enable the system control processor to communicate with the additional resource.

6. The system of claim 4, wherein the system control processor manager is further programmed to: after transmitting the notification to the system control processor, send an access control management request to a first access control manager and a second access control manager to enable direct communication, via the first access control manager and the second control manager, between the first information handling system and the second information handling system.

7. A method for providing computer implemented services using information handling systems, comprising:
obtaining, by a system control processor, a composition request for a composed information handling system;
making a first determination that a first information handling system is not capable of servicing the composition request; and
based on the first determination:
allocating, an available resource on the first information handling system to the composed information handling system;
sending a resource allocation request to the system control processor manager for access to an additional resource;
obtain, in response to the allocation request, a notification for access to a second information handling system of the information handling systems that provides the available resource;
setting up management services for available resource and the additional resource to obtain logical hardware resources; and
presenting the logical hardware resources to at least one compute resource set as bare metal resources,
wherein the first information handling system comprises the system control processor and the at least one compute resource set,
wherein the system control processor manager is programmed to:
initiate communication with the system control processor via a first access control manager, wherein the first access control manager is a firewall, wherein the firewall only permits the first information handling system to communicate with the system control processor manager until the available resource is allocated to the composed information handling system;
after initiating communication with the system control processor:
send a resource availability request to the first information handling system;
obtain a resource availability response from the first information handling system, wherein the resource availability response specifies at least a network availability of the first information handling system;
obtain, using at least the resource availability response from the first information handling system, a network connectivity topology.

8. The method of claim 7, wherein the at least one compute resource set comprises the system control processor, wherein the system control processor is further programmed to provide virtualization services for the hardware resources when providing the management services.

9. The method of claim 7, wherein the network availability specifies a current bandwidth usage of the first information handling system.

10. The method of claim 7, wherein the system control processor manager is further programmed to:
obtain the resource allocation request;
identify, based on network connectivity analysis, the second information handling system as being able to satisfy the resource allocation request using the additional resource; and
transmit the notification, via the system control processor manager, to the first information handling system.

11. The method of claim 10, wherein system control processor manager is further programmed to, after transmitting the notification to the system control processor, proxy communication between the first information handling system and the second information handling system to enable the system control processor to communicate with the additional resource.

12. The method of claim 10, wherein the system control processor manager is further programmed to: after transmitting the notification to the system control processor, send an access control management request to a first access control manager and a second access control manager to enable direct communication, via the first access control manager and the second control manager, between the first information handling system and the second information handling system.

13. A non-transitory computer readable medium comprising computer readable program code, which when executed by a computer processor enables the computer processor to perform a method for dynamically instantiating composed information handling systems, the method comprising
obtaining, by a system control processor, a composition request for a composed information handling system;
making a first determination that a first information handling system is not capable of servicing the composition request; and
based on the first determination:
allocating, an available resource on the first information handling system to the composed information handling system;
sending a resource allocation request to the system control processor manager for access to an additional resource;
obtain, in response to the allocation request, a notification for access to a second information handling system of the information handling systems that provides the available resource;
setting up management services for available resource and the additional resource to obtain logical hardware resources; and
presenting the logical hardware resources to at least one compute resource set as bare metal resources, wherein the first information handling system comprises the system control processor and the at least one compute resource set, wherein the system control processor manager is programmed to:
  initiate communication with the system control processor via a first access control manager, wherein the first access control manager is a firewall, wherein the firewall only permits the first information handling system to communicate with the system control processor manager until the available resource is allocated to the composed information handling system;
  after initiating communication with the system control processor:
    send a resource availability request to the first information handling system;
    obtain a resource availability response from the first information handling system, wherein the resource availability response specifies at least a network availability of the first information handling system;
    obtain, using at least the resource availability response from the first information handling system, a network connectivity topology.

14. The non-transitory computer readable medium of claim 13, wherein the at least one compute resource set comprises the system control processor, wherein the system control processor is further programmed to provide virtualization services for the hardware resources when providing the management services.

15. The non-transitory computer readable medium of claim 13, wherein the system control processor manager is programmed to:
  obtain the resource allocation request;
  identify, based on network connectivity analysis, the second information handling system as being able to satisfy the resource allocation request using the additional resource; and
  transmit the notification, via the system control processor manager, to the first information handling system.

* * * * *